(12) United States Patent
Miyata et al.

(10) Patent No.: US 7,539,877 B2
(45) Date of Patent: May 26, 2009

(54) DATA MANAGEMENT APPARATUS, DATA MANAGEMENT METHOD AND COMPUTER PROGRAM

(75) Inventors: Kouji Miyata, Tokyo (JP); Hiroshi Kawashima, Tokyo (JP)

(73) Assignee: Sony Corporation, Tokyo (JP)

( * ) Notice: Subject to any disclaimer, the term of this patent is extended or adjusted under 35 U.S.C. 154(b) by 705 days.

(21) Appl. No.: 10/885,211

(22) Filed: Jul. 7, 2004

(65) Prior Publication Data
US 2005/0065943 A1    Mar. 24, 2005

(30) Foreign Application Priority Data
Jul. 10, 2003    (JP)    ............... 2003-272815

(51) Int. Cl.
*G06F 11/30*    (2006.01)
*G06F 12/14*    (2006.01)
*H04L 9/32*    (2006.01)

(52) U.S. Cl. ................. 713/194; 713/189; 707/100
(58) Field of Classification Search ............... 707/100; 713/194, 189
See application file for complete search history.

(56) References Cited

U.S. PATENT DOCUMENTS
5,231,666 A * 7/1993 Matyas ................. 705/75

(Continued)

FOREIGN PATENT DOCUMENTS
JP    2002-215029    7/2002

OTHER PUBLICATIONS

Ralph C. Merkle, et al., "A Certified Digital Signature", Advances in Cryptology—CRYPTO '89, vol. 435 of Lecture Notes Computer Science, 1990, pp. 218-238.

(Continued)

*Primary Examiner*—Kambiz Zand
*Assistant Examiner*—Kari L Schmidt
(74) *Attorney, Agent, or Firm*—Oblon, Spivak, McClelland, Maier & Neustadt, P.C.

(57) ABSTRACT

Disclosed herein is a data management apparatus including, a management-data storage unit for storing management-object data, a management-data verification-value storage unit for storing a top value placed on the top of an n-branch data-management tree as a management-data verification value where n is an integer equal to or greater than two, and a data verification process unit for carrying out a process to verify validity of the management-object data on the basis of the management-data verification value, wherein, the n-branch data-management tree includes the management-object data located on a hierarchical layer at the lowest level of the n-branch data-management tree and data located on any specific hierarchical layer at a higher level of the n-branch data-management tree as a result of computation by using a irreversible function based on other data located on another hierarchical layer at a level directly subordinate to the specific hierarchical layer, and the top value is a result of computation by using the irreversible function based on data located on a hierarchical layer at the highest level of the n-branch data-management tree.

25 Claims, 20 Drawing Sheets

U.S. PATENT DOCUMENTS

| | | | |
|---|---|---|---|
| 6,754,661 B1 * | 6/2004 | Hallin et al. | 707/100 |
| 7,043,488 B1 * | 5/2006 | Baer et al. | 707/101 |
| 7,058,639 B1 * | 6/2006 | Chatterjee et al. | 707/100 |
| 7,062,493 B1 * | 6/2006 | Babka et al. | 707/100 |
| 2002/0188605 A1 * | 12/2002 | Adya et al. | 707/4 |
| 2002/0194484 A1 | 12/2002 | Bolosky et al. | |
| 2004/0236761 A1 * | 11/2004 | Both | 707/100 |
| 2005/0097077 A1 * | 5/2005 | Bolosky et al. | 707/1 |

OTHER PUBLICATIONS

Ralph C. Merkle, et al, "A Digital Signature Based On A Conventional Encryption Function", Advances in Cryptology—CRYPTO '87, vol. 293 of Lecture Notes in Computer Science, 1998, pp. 369-378.

* cited by examiner

DATA MANAGEMENT APPARATUS, DATA MANAGEMENT METHOD AND COMPUTER PROGRAM

BACKGROUND OF THE INVENTION

In general, the present invention relates to a data management apparatus, a data management method adopted in the data management apparatus and a computer program for implementing the data management method. More particularly, the present invention relates to a data management apparatus having an anti-falsification verification function capable of efficiently verifying validity of data of information supposed to be not falsified and adaptable to operations of updating data such as addition and deletion of data, relates to a data management method to be adopted in the data management apparatus as well as relates to a computer program for implementing the data management method. Examples of the information absolutely supposed to be not falsified are a content, a license information and charging information.

In recent years, services to provide various kinds of data such as musical data, video data and a game program by wire and radio communications through a variety of communication networks including the Internet and through a satellite have been becoming flourishing. In addition, circulation of contents through distributable recording media such as a DVD, a CD and a memory card has also been becoming flourishing as well. These distributed contents are stored in an apparatus owned by the user or a game apparatus. Examples of the apparatus owned by the user are a TV, a PC (Personal Computer) and a reproduction apparatus.

When a variety of contents mentioned above is used in a user apparatus such as a PC, in addition to the contents, various kinds of data are also stored in a storage unit employed in the user apparatus. The stored data includes licenses each serving as a right to use a content and charging information. These pieces of data each have a structure for preventing the data from being illegally changed by the user.

As a structure for implementing avoidance of data falsification and verification of validity of data, a digital signature is used. A digital signature is generated in an encoding process carried out on data for anti-falsification verification or on a data abstract value by applying a secret key of a disclosed-key encryption system to the encoding process. The digital signature generated in this way is added to main data as the data for anti-falsification verification.

In a data verification process to determine whether or not data has been falsified, a process of decrypting a digital signature is carried out by applying a disclosed key corresponding to the secret key applied to the above process to generate the digital signature. Then, data obtained as a result of the process to decrypt a digital signature is compared with the original data, that is, the data for anti-falsification verification or the data abstract value, to determine whether or not the resulting data matches the original data. Resulting data matching the original data proves that the main data was not falsified.

If the main data stored in the user apparatus is updated, however, the digital signature described above cannot be used as data for guaranteeing that the main data has been updated legally.

For example, the user purchases a license allowing a certain musical content to be reproduced only three times. The license is stored in a storage unit employed in the user apparatus in accordance with a content utilization program for carrying out a content utilization process based on the license. An example of the content utilization program is such as a content player and an example of the storage unit is a hard disk.

The content utilization program renews the license every time the user reproduces the musical content typically as follows:

the number of allowable remaining reproductions=2,
the number of allowable remaining reproductions=1 and
the number of allowable remaining reproductions=0.

If the content is used properly, in accordance with the license, the content cannot be reproduced more than three times.

If the user copies the license allowing the musical content to be reproduced only three times and stores the copy of the license in the storage unit as it is as backup data, however, after the content has been reproduced three times on the basis of the original license, the content can be used again by applying the license saved as the backup data.

Even if a digital signature added to the license has been verified, the same digital signature as the original one can be added to the copied license. Thus, there will be a situation in which the content utilization program determines that the copied license is valid and allows the content to be reproduced.

Documents such as Japanese Patent Laid-open No. 2003-85321 disclose a configuration in which a hash value of management-object data is used as anti-falsification verification data used for verification of no falsification of data. In the following description, Japanese Patent Laid-open No. 2003-85321 is referred to as patent document 1. However, in the configuration disclosed in patent document 1, it is necessary to generate a hash value for each piece of management-object data and keep the generated hash value as management-data verification value. Thus, the configuration raises a problem that, as the number of pieces of management-object data increases, the number of management-data verification values also rises as well.

SUMMARY OF THE INVENTION

It is thus an object of the present invention addressing the problems described above to provide a data management apparatus capable of reliably verifying no falsification of data, which is most likely to be updated, to be provided with additional data or to be deleted as is the case with a license, charging information or other kinds of information, provide a data management method to be adopted in the data management apparatus as well as provide a computer program for implementing the data management method.

In accordance with a first aspect of the present invention, there is provided a data management apparatus including:

a management-data storage unit for storing management-object data;

a management-data verification-value storage unit for storing a top value placed on the top of an n-branch data-management tree as a management-data verification value where n is an integer equal to or greater than two; and a data verification process unit for carrying out a process to verify validity of the management-object data on the basis of the management-data verification value, wherein:

the n-branch data-management tree includes the management-object data located on a hierarchical layer at the lowest level of the n-branch data-management tree and data located on any specific hierarchical layer at a higher level of the n-branch data-management tree as a result of computation by using a irreversible function based on other data located on another hierarchical layer at a level directly subordinate to the specific hierarchical layer; and the top value is a result of computation by using the irreversible function based on data located on a hierarchical layer at the highest level of the n-branch data-management tree.

In addition, an embodiment of the data management apparatus provided by the present invention is included the irreversible function is a hash function.

In addition, an embodiment of the data management apparatus provided by the present invention is included the management-data verification-value storage unit is a secure memory embedded in a security chip having a tamper prevention configuration.

In addition, an embodiment of the data management apparatus provided by the present invention is included the data verification process unit:

is embedded in a security chip having a tamper prevention configuration; and has a configuration for carrying out a data verification process by inputting data required in the data verification process from the management-data storage unit.

In addition, an embodiment of the data management apparatus provided by the present invention is included:

the management-data verification-value storage unit is a secure memory embedded in a security chip having a tamper prevention configuration; and the data verification process unit has a configuration for carrying out a data verification process by inputting management verification-value data required in the data verification process from the secure memory.

In addition, an embodiment of the data management apparatus provided by the present invention is included:

nodes including the n-branch data-management tree are each a data list comprising n values each obtained as a result of computation by using the irreversible function based on n pieces of data located on a hierarchical layer at a level directly subordinate to the data list; and the data verification process unit carries out data verification processes each determining whether or not verification data matches collation data sequentially, one process after another, in a direction from a hierarchical layer at a high level to a hierarchical layer at a low level or from a hierarchical layer at a low level to a hierarchical layer at a high level through the n-branch data-management tree where:

the verification data is a result of computation by using the irreversible function based on data provided on a lower-level hierarchical layer;

the collation data is data already included on a data list on a higher-level hierarchical layer as a computation result of the irreversible function; and the lower-level hierarchical layer and the higher-level hierarchical layer are any arbitrary two hierarchical layers in the n-branch data-management tree with the lower-level hierarchical layer serving as a direct subordinate to the higher-level hierarchical layer.

In addition, an embodiment of the data management apparatus provided by the present invention is included the data verification process unit:

determines a verification route in a direction from a hierarchical layer at a high level to a hierarchical layer at a low level or from a hierarchical layer at a low level to a hierarchical layer at a high level through the n-branch data-management tree on the basis of a list index j serving as an identification of a data list on every hierarchical layer and on the basis of an irreversible-function index k serving as an identification of an irreversible-function computation result on every data list; and carries out the data verification processes on data on the determined verification route.

In addition, an embodiment of the data management apparatus provided by the present invention is included the data verification process unit determines that no data has been falsified only if the verification data matches the collation data in all the data verification processes carried out sequentially in a direction from a hierarchical layer at a high level to a hierarchical layer at a low level or from a hierarchical layer at a low level to a hierarchical layer at a high level through the n-branch data-management tree.

In addition, an embodiment of the data management apparatus provided by the present invention is included the data verification process unit carries out the data verification processes in a direction from a hierarchical layer at a high level to a hierarchical layer at a low level or from a hierarchical layer at a low level to a hierarchical layer at a high level through the n-branch data-management tree as part of a data-updating process accompanying an operation to add, delete or change data in the n-branch data-management tree, and updates data only if the verification data matches the collation data in all the data verification processes.

In addition, an embodiment of the data management apparatus provided by the present invention is included, as part of processing for modifying a configuration of hierarchical layers to accompany an operation to add a hierarchical layer to the n-branch data-management tree or delete a hierarchical layer from the n-branch data-management tree, the data verification process unit carries out a data verification process based on pre-updating data as a process to verify validity of data required for a data-updating process accompanying the processing for modifying a configuration of hierarchical layers, and permits the processing for modifying a configuration of hierarchical layers only if a result of the data verification process determines that no data has been falsified.

In addition, an embodiment of the data management apparatus provided by the present invention is included:

the management-data verification-value storage unit is used for storing the top value, which is placed on the top of the n-branch data-management tree as a result of computation by using the irreversible function, as a management-data verification value and storing intermediate data on a hierarchical layer at an intermediate level of the n-branch data-management tree as another management-data verification value; and the data verification process unit carries out a data verification process by using the intermediate data as a management-data verification value in order to verify validity of data included in the n-branch data-management tree as data subordinate to the intermediate data.

In addition, an embodiment of the data management apparatus provided by the present invention is included:

the management-data verification-value storage unit is used for storing a plurality of computation results, which are output by the irreversible function for as many data-management trees as the computation results and placed on the tops of the respective data-management trees, each as a management-data verification value; and in order to verify validity of data included in a specific one of the data-management trees, the verification process unit carries out a data verification process setting one of the computation results, which is output by the irreversible function and placed on the top of the specific data-management tree, as a management-data verification value.

In addition, an embodiment of the data management apparatus provided by the present invention is included:

the management-data storage unit is used for storing encrypted management-object data; and a key applicable to encryption or decryption of the management-object data is stored in a storage unit employed in a security chip having a tamper prevention configuration.

In addition, an embodiment of the data management apparatus provided by the present invention is included:

the management-data storage unit is used for storing encrypted management-object data;

a second key for encrypting a first key applicable to encryption or decryption of the management-object data is stored in a storage unit employed in a security chip having a tamper prevention configuration; and the encrypted first key is decrypted in the security chip by using the second key and the first key obtained as a result of decryption is output to a component outside the security chip.

In addition, an embodiment of the data management apparatus provided by the present invention is included:

each of nodes composing the n-branch data-management tree includes an only-one value generated as a result of computation by using the irreversible function based on the n pieces of data located on a hierarchical layer at a level directly subordinate to the node; and the data verification process unit carries out a process determining whether or not verification data matches collation data where:

the verification data is a result of computation by using the irreversible function based on n pieces of data provided on a lower-level hierarchical layer;

the collation data is an only-one value already placed on a higher-level hierarchical layer as a computation result of the irreversible function; and the lower-level hierarchical layer and the higher-level hierarchical layer are any arbitrary two hierarchical layers in the n-branch data-management tree with the lower-level hierarchical layer serving as a direct subordinate to the higher-level hierarchical layer.

In addition, in accordance with a second aspect of the present invention, there is provided a data management method included the data management method includes a data verification step of carrying out a data verification process by using a top value placed on the top of an n-branch data-management tree, where n is an integer equal to or greater than two, as a management-data verification value, wherein:

the n-branch data-management tree comprises the management-object data located on a hierarchical layer at the lowest level of the n-branch data-management tree and data located on any specific hierarchical layer at a higher level of the n-branch data-management tree as a result of computation by using an irreversible function based on other data located on another hierarchical layer at a level directly subordinate to the specific hierarchical layer;

the top value is a result of computation by using the irreversible function based on data located on a hierarchical layer at the highest level of the n-branch data-management tree; and the data verification step includes the step of carrying out determination processes each determining whether or not verification data matches collation data sequentially, one process after another, in a direction from a hierarchical layer at a high level to a hierarchical layer at a low level or from a hierarchical layer at a low level to a hierarchical layer at a high level through the n-branch data-management tree where:

the verification data is a result of computation by using the irreversible function based on data provided on a lower-level hierarchical layer;

the collation data is data already included in data on a higher-level hierarchical layer as a computation result of the irreversible function; and the lower-level hierarchical layer and the higher-level hierarchical layer are any arbitrary two hierarchical layers in the n-branch data-management tree with the lower-level hierarchical layer serving as a direct subordinate to the higher-level hierarchical layer.

In addition, an embodiment of the data management method provided by the present invention is included the irreversible function is a hash function.

In addition, an embodiment of the data management method provided by the present invention is included:

nodes composing the n-branch data-management tree are each a data list comprising n values each obtained as a result of computation by using the irreversible function based on n pieces of data located on a hierarchical layer at a level directly subordinate to the data list; and at the data verification step, determination processes are carried out as processes each determining whether or not verification data matches collation data sequentially, one process after another, in a direction from a hierarchical layer at a high level to a hierarchical layer at a low level or from a hierarchical layer at a low level to a hierarchical layer at a high level through the n-branch data-management tree where:

the verification data is a result of computation by using the irreversible function based on data provided on a lower-level hierarchical layer;

the collation data is data already included on a data list on a higher-level hierarchical layer as a computation result of the irreversible function; and the lower-level hierarchical layer and the higher-level hierarchical layer are any arbitrary two hierarchical layers in the n-branch data-management tree with the lower-level hierarchical layer serving as a direct subordinate to the higher-level hierarchical layer.

In addition, an embodiment of the data management method provided by the present invention is included the data management method further includes the step of determining a verification route in a direction from a hierarchical layer at a high level to a hierarchical layer at a low level or from a hierarchical layer at a low level to a hierarchical layer at a high level through the n-branch data-management tree on the basis of a list index j serving as an identification of a data list on every hierarchical layer and on the basis of an irreversible-function index k serving as an identification of an irreversible-function computation result on every data list whereby, at the data verification step, the data verification processes are carried out on data on the determined verification route.

In addition, an embodiment of the data management method provided by the present invention is included the data verification processes are carried out in a direction from a hierarchical layer at a high level to a hierarchical layer at a low level or from a hierarchical layer at a low level to a hierarchical layer at a high level through the n-branch data-management tree as part of a data-updating process accompanying an operation to add, delete or change data in the n-branch data-management tree, and data is updated only if the verification data matches the collation data in all the data verification processes.

In addition, an embodiment of the data management method provided by the present invention is included, as part of processing for modifying a configuration of hierarchical layers to accompany an operation to add a hierarchical layer to the n-branch data-management tree or delete a hierarchical layer from the n-branch data-management tree, a data verification process based on pre-updating data is carried out as a process to verify validity of data required for a data-updating process accompanying the processing for modifying a configuration of hierarchical layers, and the processing for modifying a configuration of hierarchical layers is permitted only if a result of the data verification process determines that no data has been falsified.

In addition, an embodiment of the data management method provided by the present invention is included, at the data verification step, a data verification process using intermediate data on a hierarchical layer at an intermediate level of the n-branch data-management tree as a management-data verification value is carried out in order to verify validity of data included in the n-branch data-management tree as data subordinate to the intermediate data.

In addition, an embodiment of the data management method provided by the present invention is included, at the data verification step, a process is carried out to determine whether or not verification data matches collation data where:

the verification data is a result of computation by using the irreversible function based on n pieces of data provided on a lower-level hierarchical layer;

the collation data is an only-one value already placed on a higher-level hierarchical layer as a computation result of the irreversible function; and the lower-level hierarchical layer and the higher-level hierarchical layer are any arbitrary two hierarchical layers in the n-branch data-management tree with the lower-level hierarchical layer serving as a direct subordinate to the higher-level hierarchical layer.

In addition, in accordance with a third aspect of the present invention, there is provided a computer program to be executed in a computer system to carry out a data verification process. The computer program is included a data verification step of carrying out the data verification process by using a top value placed on the top of an n-branch data-management tree, where n is an integer equal to or greater than two, as a management-data verification value, wherein:

the n-branch data-management tree includes the management-object data located on a hierarchical layer at the lowest level of the n-branch data-management tree and data located on any specific hierarchical layer at a higher level of the n-branch data-management tree as a result of computation by using an irreversible function based on other data located on another hierarchical layer at a level directly subordinate to the specific hierarchical layer;

the top value is a result of computation by using the irreversible function based on data located on a hierarchical layer at the highest level of the n-branch data-management tree; and the data verification step includes the step of carrying out determination processes each determining whether or not verification data matches collation data sequentially, one process after another, in a direction from a hierarchical layer at a high level to a hierarchical layer at a low level or from a hierarchical layer at a low level to a hierarchical layer at a high level through the n-branch data-management tree where:

the verification data is a result of computation by using the irreversible function based on data provided on a lower-level hierarchical layer;

the collation data is data already included in data on a higher-level hierarchical layer as a computation result of the irreversible function; and the lower-level hierarchical layer and the higher-level hierarchical layer are any arbitrary two hierarchical layers in the n-branch data-management tree with the lower-level hierarchical layer serving as a direct subordinate to the higher-level hierarchical layer.

It is to be noted that the computer program provided by the present invention is a computer program that can be provided to a computer system capable of executing typically various kinds of program code by installing the program in the computer system from a recording medium such as a CD, a FD or an MO for storing the program in a computer-executable format, or by downloading the program from a download site to the computer system through communication media such as a network. By providing the computer program to the computer system in a computer-executable format, the computer system is capable of carrying out processing according to the program.

The following detailed description of embodiments of the present invention with reference to accompanying diagrams will clarify other objects of the present invention as well as characteristics displayed by and merits offered by the present invention. It is to be noted that a system in this specification means the entire system comprising a plurality of apparatus logically connected to each other. However, the apparatus do not have to be physically enclosed in a cabinet.

In accordance with a configuration of the present invention, a hash value is typically stored in a storage unit employed in a security chip. To be used as a management-data verification value, the hash value is a value computed by using an irreversible function on the basis of a hash list provided on the hierarchical layer at the highest level of a data-management tree and placed on the top of the tree. By using this management-data verification value, it is possible to verify validity of all pieces of management-object data placed on the hierarchical layer at the lowest level of the data-management tree. Validity of many pieces of management-object data can thus be verified without the need to raise the information amount of the management-data verification value stored in the storage unit employed in the security chip to accompany an increase in number of pieces of management-object data.

In addition, in accordance with another configuration of the present invention, in data-updating processing data such as processes to add, delete and change management-object data, a data verification process using values computed by the irreversible function executed on the data-management tree is also carried out. Thus, it is possible to avoid illegal operations to update the management-object data and to implement proper management of the data. The values computed by the irreversible function are typically hash values.

On the top of that, in accordance with a further configuration of the present invention, the storage unit employed in the security chip is used for storing not only a top hash value placed on the top of the tree as a result of computation using the irreversible function on the basis of the hash list provided on the hierarchical layer at the highest level of the data-management tree, but also typically an intermediate hash value obtained as a result of computation using the irreversible function on the basis of a hash list provided on a hierarchical layer at an intermediate level of the data-management tree. This intermediate hash value is used as a management-data verification value in a process of verifying data subordinate to the intermediate hash value. Thus, the process of verifying data subordinate to the intermediate hash value can be carried out with a high degree of efficiency.

Furthermore, in accordance with a still further configuration of the present invention, a process to add a hierarchical layer to the data-management tree and delete a hierarchical layer from the data-management tree can be carried out properly, and any data or an intermediate hash value of the data-management tree can be used as a management-data verification value. It is thus possible to execute data management based on a data-management tree having a variety of forms.

Moreover, in accordance with a still further configuration of the present invention, management-object data is encrypted in an encryption process using a key stored in the security chip, and data management based on a data-management tree including the encrypted management-object data is executed. Thus, management-object data can be effectively prevented from being leaked.

DETAILED DESCRIPTION OF THE PREFERRED EMBODIMENTS

The following description explains details of a data management apparatus provided by the present invention, a data management method adopted in the data management apparatus and a computer program for implementing the data management method. It is to be noted that these details are described in paragraphs arranged in the following order:

1: Configuration of the Data Management Apparatus
2: Configuration of the Security Chip
3: Data Management Configuration
4: Verification of Validity of Management-Object Data
5: Data Addition, Modification and Deletion
6: Determination of a Verification Route
7: Data-Management Tree Having one Hash-List Hierarchical Layer
8: Increasing and Decreasing Hierarchical Layers
9: Encryption and Decryption of Management-Object Data
10: Verification Using Intermediate Hierarchical Layer Hash List
11: Management Configuration Based on a Plurality of Data Management Trees
12: Configuration Using the Root Hash List as a Data-Management Verification Value
13: Configuration Setting and Managing Management-Data Verification Values for Any Portions of the Data-Management Tree
14: Data-Management Tree Comprising Hash Values

[1. Configuration of the Data Management Apparatus]

Figure 1:
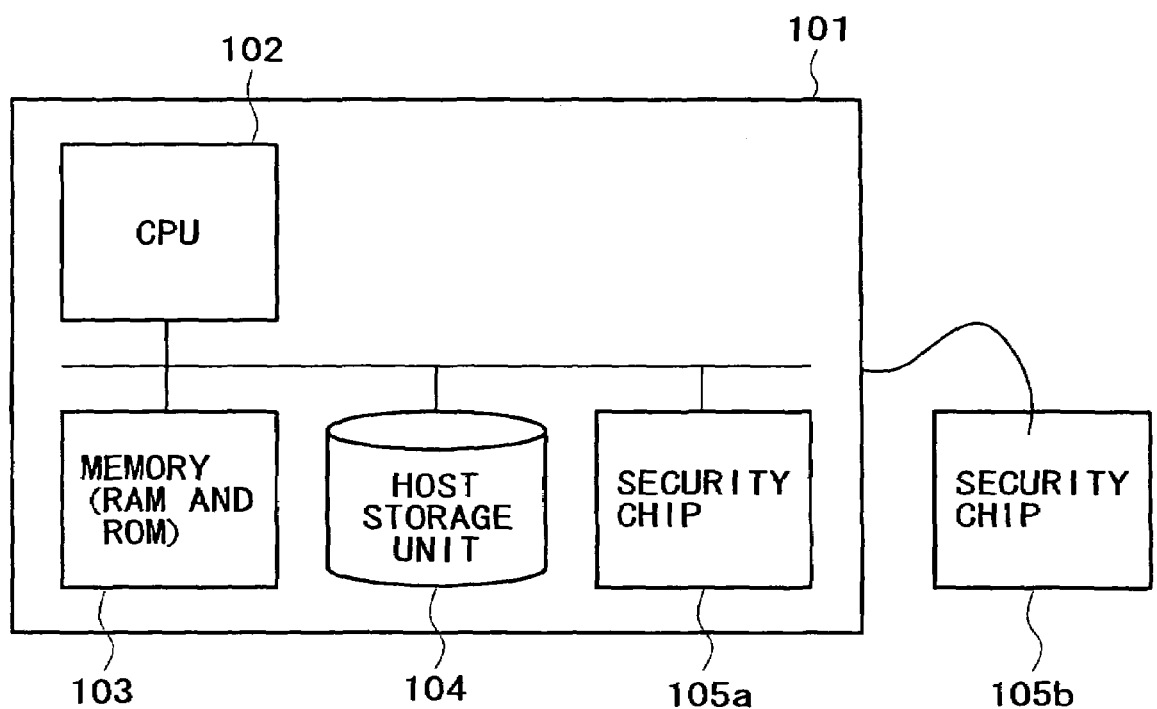
FIG. 1 is a diagram showing the configuration of a data-management apparatus provided by the present invention.

FIG. 1 is a diagram showing a typical configuration of a data management apparatus implemented by an embodiment of the present invention. As shown in the figure, the data management apparatus 101 comprises a CPU (Central Processing Unit) 102 having a program execution function and an operation-processing function. To put it concretely, the CPU 102 controls operations to make accesses to a security chip 105 and save various kinds of data in a host storage unit 104 as well as read out the data from the host storage unit 104.

A memory 103 comprises a ROM (Read Only Memory) and a RAM (Random Access Memory). The ROM is a memory for storing a variety of programs such as a variety of application programs to be executed by the CPU 102. The RAM is a memory into which a program is loaded for execution. The RAM is also used as a work area for execution of a program.

The host storage unit 104 stores various kinds of management-object data managed in the data management apparatus 101 and hash lists of a data-management tree. Examples of the management-object data are a content, a license and charging information. The hash lists of a data-management tree will be described later in detail.

The security chips 105a and 105b each carry out a process to verify validity of management-object data managed in the data management apparatus 101. The security chips 105a and 105b each have a tamper prevention configuration for preventing stored data from being changed by an illegal access made by an external access maker. To put it concretely, the stored data can be changed only by predetermined processing programs stored in the security chips 105a and 105b. As an alternative, security chips 105a and 105b each carry out processing such as a process allowing only data supplied by an authenticated external apparatus as updating data. The figure shows a configuration in which security chip 105a is provided inside the data management apparatus 101 while the security chip 105b is provided outside the data management apparatus 101. However, the data management apparatus 101 needs merely either of them. That is to say, a security chip can be provided either inside or outside the data management apparatus 101. If a security chip is provided outside the data management apparatus 101, the chip must be capable of communicating data with the data management apparatus 101.

[2. Configuration of the Security Chip]

Figure 2:
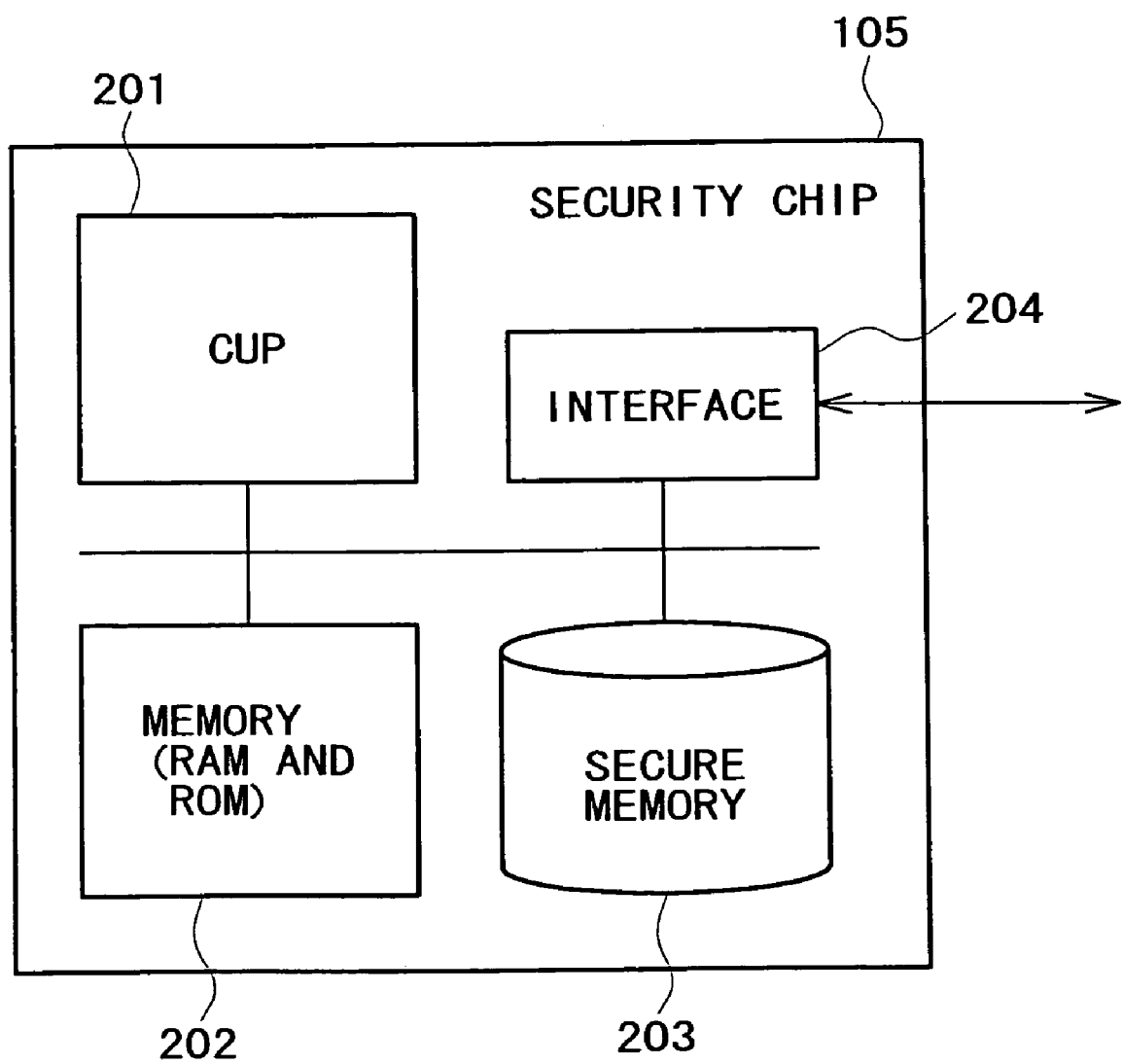
FIG. 2 is a diagram showing the configuration of a security chip.

Next, the configuration of the security chip 105 is explained by referring to FIG. 2. A CPU 201 exchanges data with units external to the security chip 105, makes accesses to a secure memory 203 embedded in the security chip 105 as well as processes data received from other units in the data management apparatus 101 and data to be output to the other units in the data management apparatus 101.

A memory 202 comprises a ROM (Read Only Memory) and a RAM (Random Access Memory). The ROM is a memory for storing a variety of programs such as a variety of application programs to be executed by the CPU 201. The RAM is a memory into which a program is loaded for execution. The RAM is also used as a work area for execution of a program.

A secure memory 203 is a memory area accessible to a program executed by the CPU 201. The secure memory 203 is also a data storage area for avoiding falsification based on an access made by an access maker external to data stored in the secure memory 203. An interface 204 is a module having a function for preventing accesses from being made to data appearing on a data bus inside the security chip 105 as well as data stored in the memory 202 and the secure memory 203. That is to say, the security chip 105 is a chip having a tamper prevention configuration.

[3. Data Management Configuration]

The following description explains a data management configuration based on values computed by using an irreversible function of various kinds of management-object data and a data-management tree. An example of such a data management configuration is a data management comprisess hash values. The management-object data comprises a content, a license and charging data. The hash lists and the management-object data, which compose the data-management tree, are stored in the host storage unit 104 employed in the data management apparatus 101 shown in FIG. 1. It is to be noted that, in the following description of an embodiment, a typical case of computing applying hash values by using an irreversible function is taken as an example. However, the present invention also comprises a configuration using an irreversible function other than that for computing hash values.

Figure 3:
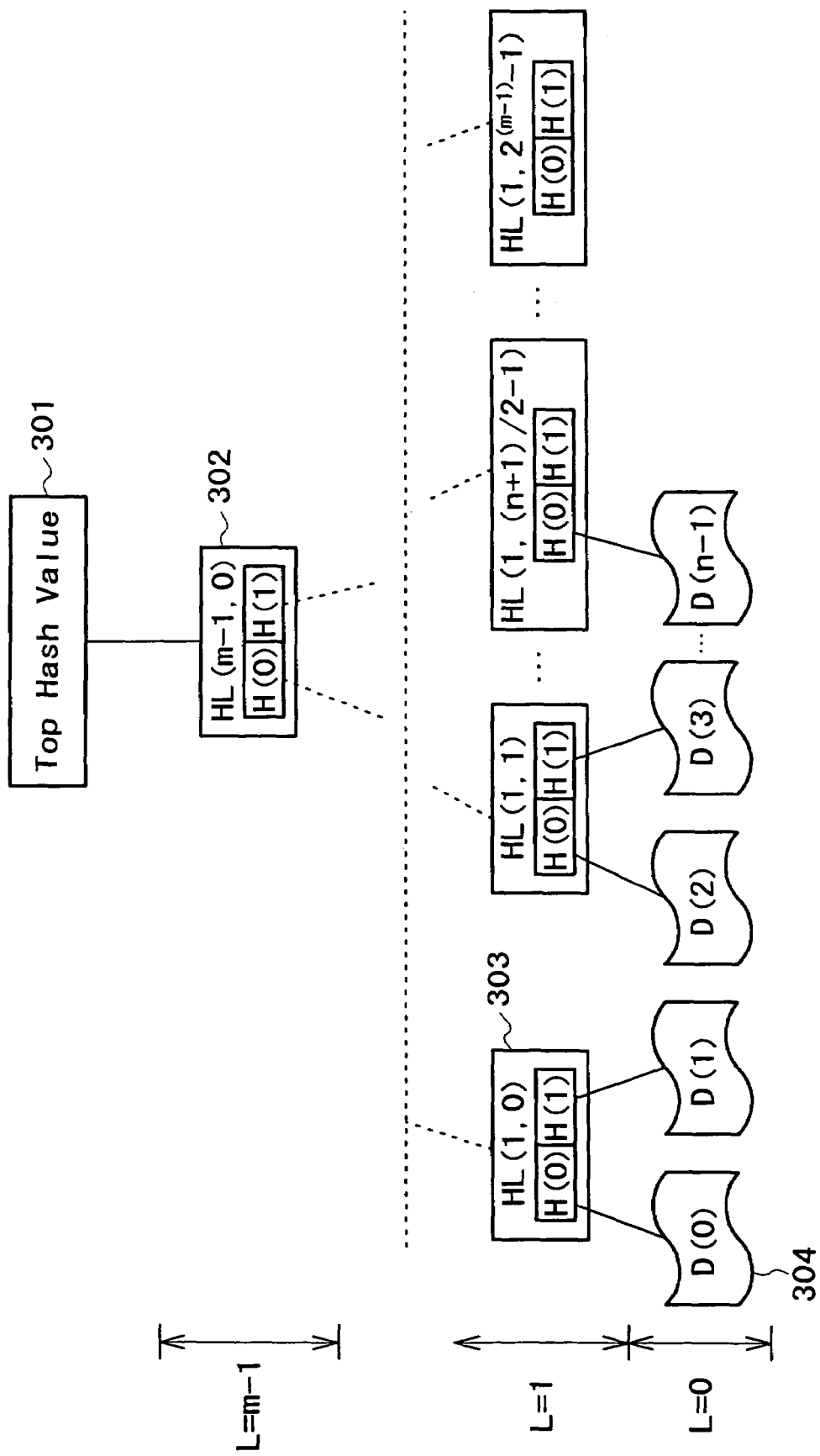
FIG. 3 is a diagram showing a typical configuration of a data-management tree.

FIG. 3 is a diagram showing an organization of pieces of management-object data in a data-management tree having a hierarchical-layer count m and management-data piece count n. On the hierarchical layer at the lowest level in the data structure shown in FIG. 3, that is, on the hierarchical layer L (=0), pieces of management-object data such as a content, a license and charging information are set. The management-object data D (x) is the management-object data mentioned above where x denotes an index of the management-object data. This index x is referred to hereafter as a data index. If the number of pieces of management-object data is n, the data index x has values in the range 0 to (n−1).

The management-object data D (x) on the hierarchical layer L (=0) is the substance of one of various kinds of management-object data such as a content, a license and charging information. For example, the management-object data D (0) denoted by reference numeral 304 is the substance of management-object data to which a data index of 0 is assigned.

In the data-management tree, data HL (L, j) on each upper-level hierarchical layer other than L=0, that is, on a hierarchical layer L (>0), is a hash list. Notation L of HL (L, j) in the data-management tree denotes the level number of the hierarchical layer, on which the hash list HL (L, j) is provided. The hierarchical-layer number L has a value in the range 0 to (m−1). On the other hand, notation j of HL (L, j) denotes an index assigned to the hash list HL (L, j) provided on the hierarchical layer L. For example, the hash list HL (1, 0) denoted by reference numeral 303 in FIG. 3 is a hash list, which is provided on the hierarchical layer L (=1) and has an assigned index j of 0.

An index assigned to a specific hash list provided on a hierarchical layer is an identification number for distinguishing the specific hash list from other hash lists provided on the same hierarchical layer. For example, an index of 0 is assigned to a hash list provided at the left end of every hierarchical layer and an index of $\{2^{(m-1)}-1\}$ is assigned to a hash list provided at the right end of a hierarchical layer of a level number m as shown in FIG. 3. That is to say, an index assigned to a hash list provided on a hierarchical layer of a level m has a value in the range 0 to $\{2^{(m-1)}-1\}$. It is to be noted that an index assigned to a hash list is denoted by reference numeral j as described above. In other words, an index j assigned to a hash list provided on a hierarchical layer of a level m is an identification number having a value in the range 0 to $\{2^{(m-1)}-1\}$.

A hash list HL (L, j) is a list for storing hash values generated on the basis of data provided on a hierarchical layer directly subordinate to the hash list HL (H, j). The data-management tree shown in FIG. 3 is a 2-branch data-management tree. A 2-branch data-management tree is a tree in which every node of the tree has two directly subordinate nodes or directly subordinate leaves. It is to be noted that a leave is a node on the lowest-level hierarchical layer L (=0). In the data-management tree, elements other than leaves are each referred to as a node.

Since the data-management tree shown in FIG. 3 is a 2-branch data-management tree, every hash list HL (L, j) contains two hash values respectively corresponding to the two nodes or the two leaves directly subordinate to the hash list HL (H, j).

The hash values HL (H, j).H (k) contained in a hash list (H, j) are each generated on the basis of data directly subordinate to the hash list HL (H, j). Notation k denotes an index assigned to a hash value HL (H, j).H (k) contained in a hash list (H, j). In the case of a 2-branch data-management tree, as described above, every hash list HL (L, j) contains two hash values H (k) to which two indexes of 0 and 1 respectively are assigned.

In the data-management tree shown in FIG. 3, the hash list HL (1, 0) provided at the left end of the hierarchical layer L (=1) as a hash list 303 contains two hash values HL (1, 0).H (0) and HL (1, 0).H (1) respectively corresponding to two pieces of data D (0) and D (1) on leaves directly subordinate to the hash list HL (1, 0). More specifically, the hash value HL (1, 0).H (0) comprised in the hash list HL (1, 0) corresponds to the directly subordinate data D (0) and the hash value HL (1, 0).H (1) comprised in the hash list HL (1, 0) corresponds to the directly subordinate data D (1).

It is to be noted that an algorithm for computing a hash value is an algorithm set in advance. An example thereof is the SHA-1 algorithm.

In addition, it is also possible to use a data-management tree in which every node has three or more directly subordinate nodes or directly subordinate leaves. An example of such a tree is a 3-branch data-management tree in which every node has three directly subordinate nodes or directly subordinate leaves.

The index k assigned to a hash value is also referred to as an irreversible-function index used as a computed-value identification of the irreversible function. The hash-value index k has a value in a range determined by the number of branches. In the case of a 2-branch data-management tree, for example, the hash-value index k has a value of 0 or 1. In the case of a 3-branch data-management tree, on the other hand, the hash-value index k has a value of 0, 1 or 2.

It is to be noted that every node does not always have a directly subordinate node or leave. Thus, if a hash value contained in a hash list does not have directly subordinate data corresponding to the hash value, the configuration of a process for computing the hash value of the hash list can be determined arbitrarily. If a hash value contained in a hash list does not have directly subordinate data corresponding to the hash value, it is assumed in the following description that a hash value (Hash null) corresponding to data null having a length of 0 is used as the hash value.

Hash lists comprised in the hierarchical-layer tree are classified into two categories as follows:

Category 1: Hash lists on the hierarchical layer L (=1) each contain hash values each corresponding to directly subordinate data.

Category 2: Hash lists on the hierarchical layer L (>1) each contain hash values each corresponding to a directly subordinate hash list.

The data-management tree is a tree having a hierarchical-layer structure in which each leaf on the hierarchical layer at the lowest level is management-object data and every hash list on the other hierarchical layers at higher levels contains hash values each generated on the basis of data immediately subordinate thereto as shown in FIG. 3.

It is to be noted that, as described above, the number of hash values contained in every hash list is arbitrary. The tree configuration shown in FIG. 3 is the structure of a 2-branch data-management tree in which every hash list contains two hash values.

A top hash value 301 is a hash value generated on the basis of a plurality of hash values HL (m−1, 0).H (0) and HL (m−1, 0).H (1) contained on the top hash list 302, which is the hash list HL (m−1, 0) shown in FIG. 3.

Hash lists and management-object data, which compose a data-management tree, are stored in the host storage unit 104 employed in the data management apparatus 101 shown in FIG. 1. In addition, the secure memory 203 employed in the security chip 105 shown in FIG. 2 is used for holding at least the top hash value 301 of the data-management tree shown in FIG. 3 as a management-data verification value.

Since the storage capacity of the secure memory 203 employed in the security chip 105 is relatively small, the amount of data that can be stored in the secure memory 203 is limited. In the configuration of the present invention, however, the storage capacity of the secure memory 203 is large enough for securely holding at least the top hash value 301 as described above. Thus, it is possible to verify validity of data on every leaf.

[4. Verification of Validity of Management-Object Data]

The following description explains a data verification process carried out by the data management apparatus 101 in which a data-management tree comprising management-object data and hash lists as shown in FIG. 3 is stored. To be more specific, the following description explains a data verification process carried out on a piece of management-object data represented by a leaf in the data-management tree shown in FIG. 3.

To be even more specific, the following description explains a data verification process to verify that D (dataID) is perfect and in the most recent state, where symbol dataID denotes the data index x and symbol D (dataID) denotes management-object data identified by the data index x (=dataID).

Figure 4:
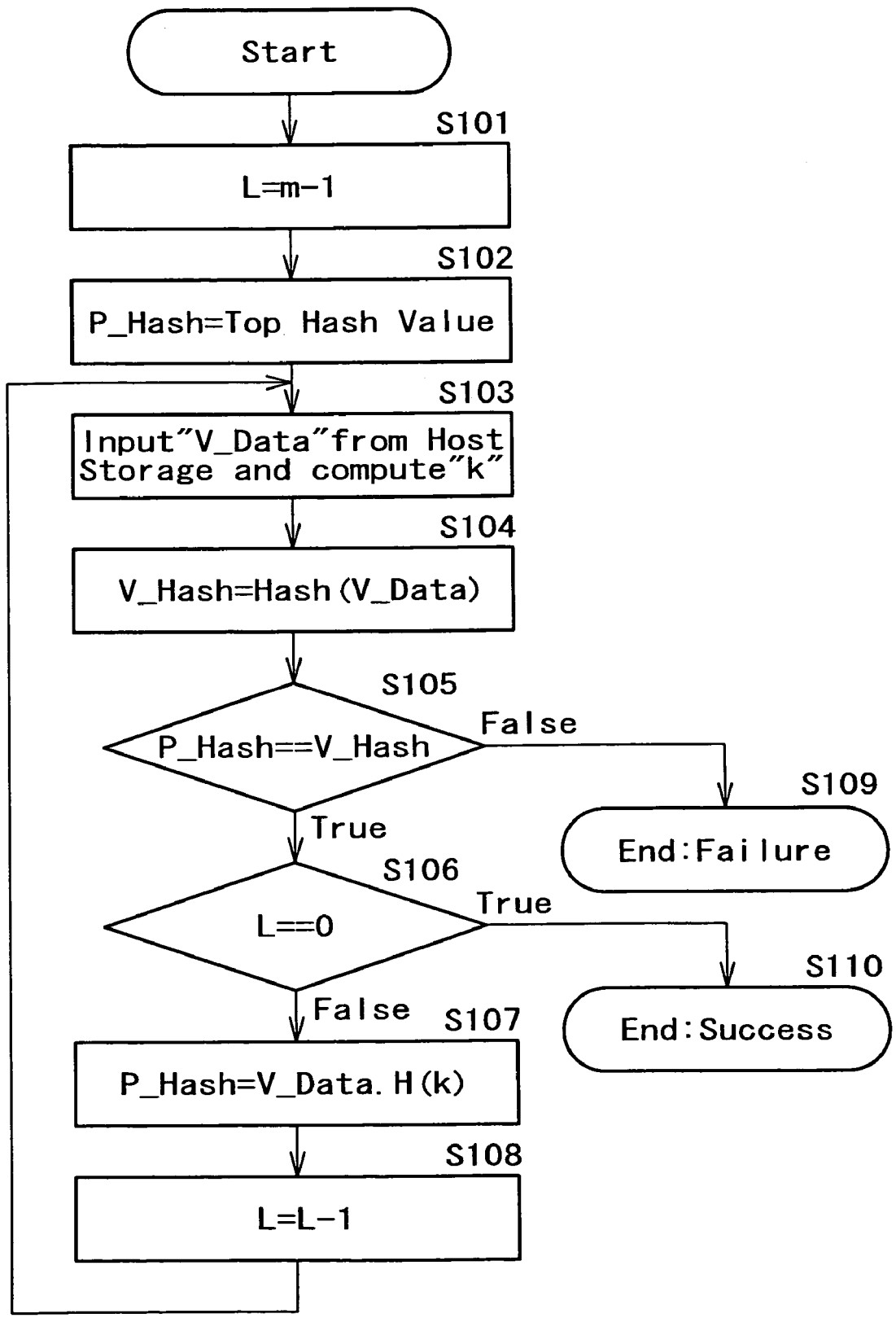
FIG. 4 shows a flowchart referred to in explaining the procedure of a data verification process based on a data-management tree.
Figure 6:
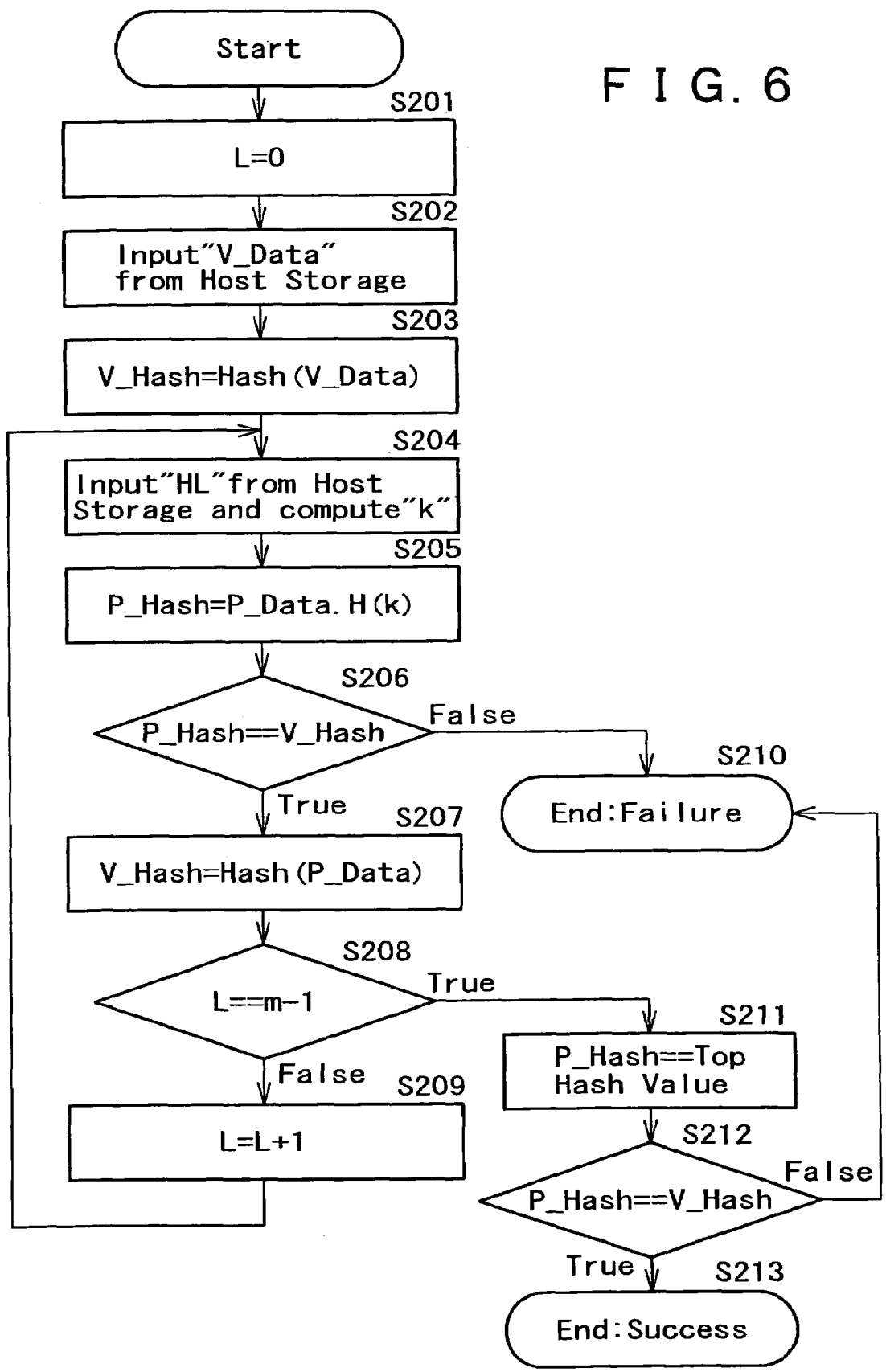
FIG. 6 shows a flowchart referred to in explaining the procedure of a data verification process based on a data-management tree.

There are two methods that can each be adopted as a verification technique. One of the methods is a technique whereby a data verification process starts from the hierarchical level L at the highest level (L=m−1) and is carried out in a direction toward subordinates. The other method is a technique whereby a data verification process starts from the hierarchical level L at the lowest level (L=0) and is carried out in a direction toward hierarchical layers at higher levels. FIG. 4 shows a flowchart representing a procedure for carrying out a data verification process from the hierarchical level L at the highest level in the direction toward subordinates. On the other hand, FIG. 6 shows a flowchart representing a procedure for carrying out a data verification process from the hierarchical level L at the lowest level in the direction toward hierarchical layers at higher levels.

The data verification process can be carried out under control executed by the CPU 102 employed in the data management apparatus 101 shown in FIG. 1 or control executed by the CPU 201 employed in the security chip 105 shown in FIG. 2. If the data verification process is carried out under control executed by the CPU 102 employed in the data management apparatus 101, the CPU 102 acquires management-data verification values stored in advance in the secure memory 203 employed in the security chip 105 and then varies out the data verification process on the basis of the acquired management-data verification values. It is to be noted that the management-data verification values comprise the top hash value in the data-management tree shown in FIG. 3. If the data verification process is carried out under control executed by the CPU 201 employed in the security chip 105, on the other hand, the CPU 201 properly acquires necessary information from the host storage unit 104 employed in the data management apparatus 101.

(1): Verification Process in the Top-Down Direction

First of all, a procedure of the data verification process carried out, starting with the hierarchical layer at the highest level of the data-management tree in the direction toward subordinates is explained by referring to the flowchart shown in FIG. 4. The flowchart begins with a step S101 at which a variable L representing the level of a hierarchical layer in the data-management tree of data to be verified is initialized. That is to say, an initial value of the hierarchical layer identification L is set.

It is to be noted that the eventual data to be verified is normally data on the hierarchical layer at the lowest level. That is to say, the eventual data is actual data such as a content, a license or charging data. In accordance with this method whereby the data verification process is carried out from the hierarchical layer at the highest level in the data-management tree in the direction toward subordinates, data being verified is changed sequentially, starting from one on the top to pieces of data on hierarchical layers at lower levels one layer after another to arrive at the eventual data on the hierarchical layer at the lowest level at which the data verification process is ended.

At the step S101, the hierarchical layer identification L is set at an initial value of (m−1). That is to say, the hierarchical layer identification L is set at an initial value representing the hierarchical layer (m−1) at the highest level comprising a hash list HL (m−1, 0) directly subordinate to the top hash value 301 of the data-management tree shown in FIG. 3.

Then, at the next step S102, a collation value [P_Hash] is initialized. The collation value [P_Hash] is defined as a value to be collated with data being verified. In this method whereby the data verification process is carried out from the hierarchical layer at the highest level in the data-management tree in the direction toward subordinates, at the step S102, the collation value [P_Hash] is initialized at the top hash value 301 of the data-management tree shown in FIG. 3.

Then, at the next step S103, verification-object data [V_Data] is acquired from the host storage unit 104 and a hash-value index k of the verification-object data [V_Data] is found as information defining a verification route, which starts from the hierarchical layer at the highest level in the data-management tree in the direction toward subordinates. The verification-object data [V_Data] is data serving as an object of verification based on the collation value [P_Hash]. The first verification-object data [V_Data] is a hash list 302 of the data-management tree shown in FIG. 3. The hash value of the hash list 302 will be compared with the first collation value [P_Hash], which is set at the top hash value 301.

Generally speaking, the verification-object data [V_Data] is a hash list (L, j) provided on a hierarchical layer L for L>0 where notation j denotes a hash-list index assigned to the hash list (L, j) provided on the hierarchical layer L. In the case of the hierarchical layer L at the lowest level, that is, in the case of L=0, on the other hand, the verification-object data [V_Data] is management-object data D (dataID).

The hash-value index k is a value for defining a verification route starting from the hierarchical layer at the highest level of the data-management tree in the direction towards subordinates. For example, a verification route of eventual verification-object data 327 in a data-management tree shown in FIG. 5 starts from a top hash value 321 to pass through hash lists 322, 323, 324, 325 and 326, ending at the eventual verification-object data 327. That is to say, hash-value indexes k define the verification route connecting the top hash value 321 to the eventual verification-object data 327 as a route comprising hash values used as a base for carrying out a data verification process.

Figure 5:
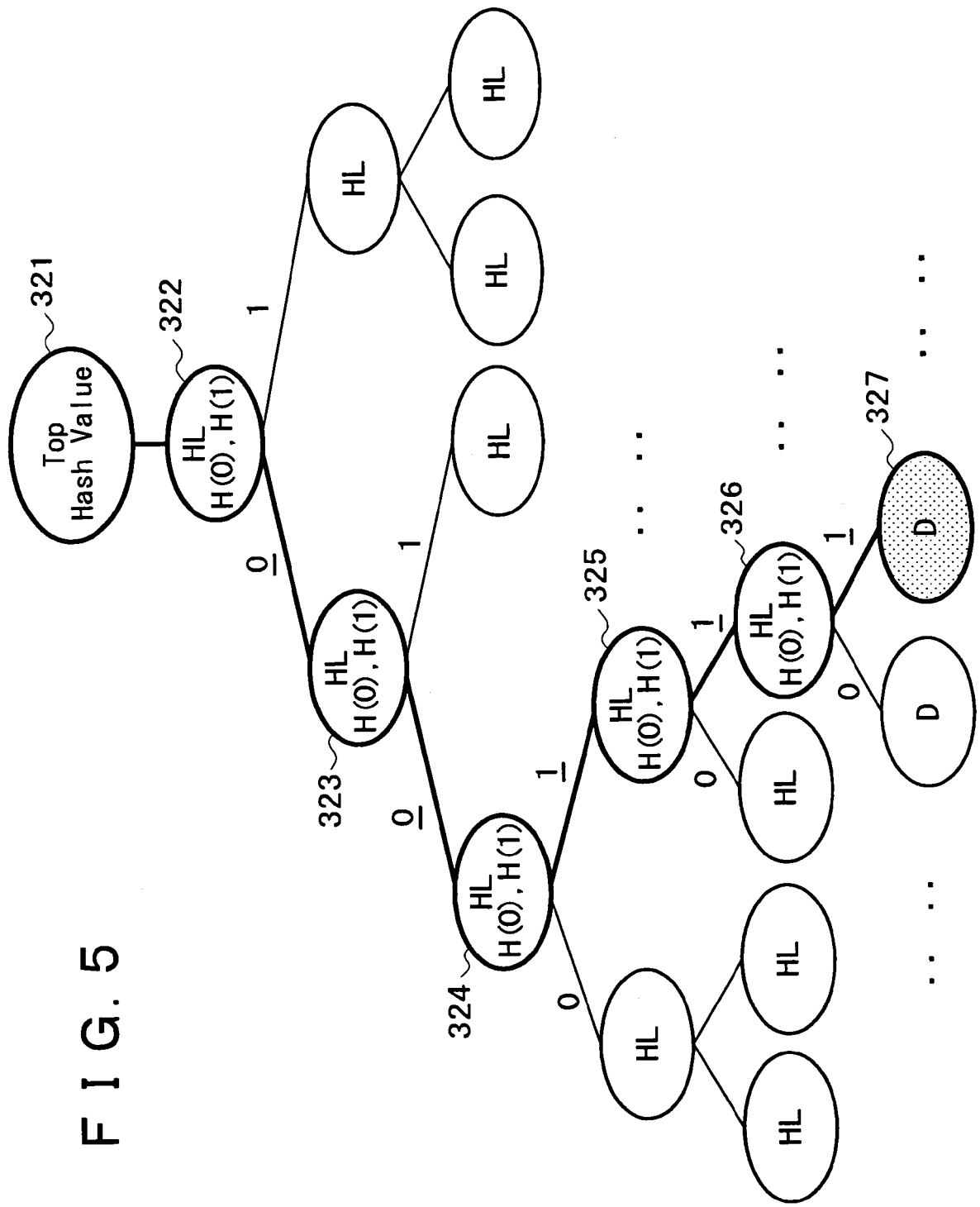
FIG. 5 is an explanatory diagram referred to in explanation of a process to set a verification route.

Hash-value indexes used as verification-route definition information serve as values defining a path starting from the top hash value 321 and ending at the eventual verification-object data D327. FIG. 5 is a diagram showing typical hash-value indexes k having a value of 0 on the left side and a value of one on the right side. Since the data 327 in the data-management tree shown in FIG. 5 is data to be verified eventually, the verification route starting from the top hash value 321 and ending at the data 327 is defined by a series of hash-value indexes k of 0, 0, 1, 1 and 1. In the case of a 2-branch data-management tree described above, the hash-value index k has either one of two different typical values, i.e., 0 and 1. One of the two different values selects one of two routes. In the case of a 3-branch data-management tree, the hash-value index k has either one of three different typical values, i.e., 0, 1 and 2, one of which can be selected in every process to determine a verification route. It is to be noted that a process of determining a verification route will be described in detail later.

As shown in FIG. 5, a determination route is determined on the basis of the tree structure and the eventual data to be verified. As described above, hash-value indexes k are used as verification-route definition information. A verification route can be defined by the CPU 102 employed in the data management apparatus 101 or the CPU 201 employed in the security chip 105.

At a step S104, a hash value [V_Hash] of the verification-object data [V_Data] acquired from the host storage unit 104 is found by computation. It is to be noted that, as described above, the algorithm for finding a hash value is an algorithm determined in advance. As an example thereof, the SHA-1 algorithm can be adopted.

As described above, the first verification-object data [V_Data] acquired from the host storage unit 104 is the hash list 302, which has two hash values HL (m−1, 0).H (0) and HL (m−1, 0).H (1) as shown in FIG. 3. At the step S104, the hash value [V_Hash] of the verification-object data [V_Data] is found on the basis of the two hash values HL (m−−1, 0).H (0) and HL (m−1, 0).H (1). More specifically, a hash algorithm such as SHA-1 is applied to data connecting the two hash values HL (m−1, 0).H (0) and HL (m−1, 0).H (1) to find the verification-object hash value [V_Hash].

Then, at the next step S105, the verification-object hash value [V_Hash] found as the hash value of the verification-object data [V_Data] is collated with the collation hash value [P_Hash] to determine whether or not the former matches the latter.

If the former does not match the latter, that is, if P_Hash≠V_Hash, the verification-object data [V_Data] is determined to be falsified data or a hash list comprising hash values found on the basis of falsified data. In this case, the flow of the procedure goes on to a step S109 at which the data verification process is ended in a failure.

If the result of the collation carried out at the step S105 indicates that the former matches the latter, that is, if P_Hash=V_Hash, on the other hand, the verification-object data [V_Data] is determined to be the true data or a hash list comprising no hash values found on the basis of falsified data.

If the validity of the verification-object data [V_Data] is verified as described above, the flow of the procedure goes on to a step S106 to determine whether or not the data verification process has been completed by finding out whether or not the hierarchical-layer identification L identifying a hierarchical layer comprised in the data-management tree as a hierarchical layer containing the verification-object data is 0, that is, whether or not the data serving as the object of verification is data corresponding to a leaf on the lowest-level hierarchical layer of the data-management tree.

This verification method is a technique whereby a sequential verification process is carried out along a verification route starting from the hierarchical layer at the highest level of the data-management tree in the direction towards subordinates. The arrival of the data verification process at a hierarchical level for L=0 means that there is no longer verification-object data at a lower level. Thus, the collation result of the step S105 indicating that the verification-object hash value matches the collation hash value and the determination result obtained at the step S106 indicating that the hierarchical-layer identification L is 0 representing the lowest level of the data-management tree means that a verification-object hash value [V_Hash] generated on the basis of the verification-object data [V_Data], which is the management-object data for L=0 or the management-object data on the hierarchical layer at the bottom level of the data-management tree, matches the collation hash value [P_Hash]. A verification-object hash value matching its collation hash value for L=0 implies that the data verification process carried out along the verification route starting from the top hash value 321 and ending at the last verification-object data 327 gives results all indicating successful collations. That is to say, the data verification process has been carried out successfully. In this case, the flow of the procedure goes on to a step S110 at which the data verification process is ended normally. That is to say, the data verification process is ended with a result of determination indicating no data falsification.

On the other hand, a determination result of the step S106 indicating that L is not 0 means that there is still a node or leaf to be verified on a hierarchical layer at a lower level. In this case, the flow of the procedure goes on to a step S107 at which the collation hash value [P_Hash] is updated. That is to say, the current collation hash value [P_Hash] is replaced with a hash value on a hierarchical layer one level below the current collation hash value [P_Hash], in the data-management tree.

A new collation hash value [P_Hash] used for replacing the current collation hash value [P_Hash] is comprised in the current verification-object data [V_Data], which comprises a plurality of hash values. Thus, a hash value indicated by the index k, namely, V_Data.H (k), is selected as the new collation hash value [P_Hash].

In the typical verification process carried out through the data-management tree shown in FIG. 5, for example, the top hash value 321 used as the current collation hash value [P_Hash] is collated with a hash value generated on the basis of a hash list HL 322 used as the current verification-object data [V_Data] and, if they match each other, one of the hash values H (0) and H (1) of the hash list HL 322 is selected in accordance with the value of the index k serving as verification-route definition information as a new collation hash value [P_Hash]. In this case, since k=0, the hash value H (0) is selected as a new collation hash value [P_Hash] replacing the current collation hash value [P_Hash].

Then, at the next step S108, the identifier L identifying a hierarchical layer in the data-management tree comprising data being verified is decremented. To be more specific, the hierarchical-layer identifier L is updated to a value indicating a new hierarchical layer one level beneath the current hierarchical layer so that the data verification process can be carried out next on the new lower hierarchical layer.

Then, the flow of the procedure goes back to the step S103 to repeat the processing described above from this step. The processing described above is carried out repeatedly till the data verification process ends in a failure or the data verification process is completed successfully. In this way, the data verification process is carried out by repeated collations through a verification route traced from the hierarchical layer at the top level to the hierarchical layer at the bottom level in the data-management tree. Finally, when a verification-object hash value [V_Hash] generated on the basis of the verification-object data [V_Data], which is the management-object data for the hierarchical layer at the bottom level, that is, the management-object data for the hierarchical layer L=0, matches the collation hash value [P_Hash] of the hierarchical layer above the hierarchical layer at the bottom level, collations of data between all adjacent hierarchical layers along the verification route are considered to have resulted in collation-matching outcomes indicating that there is no falsified data. In this case, the data verification process is completed normally.

If a result of any collation of data on the verification route indicates that collated hash values do not match each other, on the other hand, the flow of the procedure goes on to the step S109 at which the data verification process is ended in a failure indicating an evidence of data falsification.

(2): Verification Process in the Bottom-Up Direction

Next, a procedure of the data verification process carried out, starting with the hierarchical layer at the lowest level of the data-management tree in the direction toward hierarchical layers at higher levels is explained by referring to a flowchart shown in FIG. 6. The flowchart begins with a step S201 at which a variable L representing the level of a hierarchical layer in the data-management tree of data to be verified is initialized. That is to say, an initial value of the hierarchical layer identification L is set.

In the case of this method, the variable L is set at an initial value of 0 representing the hierarchical layer at the lowest level of the data-management tree.

Then, at the next step S202, verification-object data [V_Data] is acquired from the host storage unit 104. The verification-object data [V_Data] is data to be used as an object of verification based on a collation hash value [P_Hash]. In the example, data 327 on the hierarchical layer at the lowest level of the data-management tree shown in FIG. 5 is used as the first verification-object data. A hash value generated on the basis of the data 327 will be collated with a selected one of hash values comprised in a hash list 326 on the hierarchical layer at a level directly above the data 327. In this case, a hash value H (1) of the hash list 326 will be selected as the collation hash value [P_Hash].

Generally speaking, the verification-object data [V_Data] is a hash list (L, j) provided on a hierarchical layer L for L>0 where notation j denotes a hash-list index assigned to the hash list (L, j) provided on the hierarchical layer L. In the case of the hierarchical layer L at the lowest level, that is, in the case of L=0, on the other hand, the verification-object data [V_Data] is management-object data D (dataID). In this example, management-object data D (dataID), which is management-object data to serve as an object of verification, is used as the first verification-object data.

Then, at the next step S203, a hash value [V_Hash] of the verification-object data [V_Data] acquired from the host storage unit 104 is found by computation and used as a verification-object hash value [V_Hash]. It is to be noted that, as described above, the algorithm for finding a hash value is an algorithm determined in advance. As an example thereof, the SHA-1 algorithm can be adopted.

Then, at the next step S204, a hash list HL comprising a collation hash value is read out from the host storage unit 104 to be used as collation data [P_Data] and a hash-value index k of the collation data [P_Data] is found to be used as information defining the verification route.

The collation data [P_Data] is a hash list provided on a hierarchical layer at a level directly above the level of the hierarchical layer, on which the verification-object data [V_Data] exists, and directly connected to the verification-object data [V_Data]. That is to say, in the typical verification process carried out through the data-management tree shown in FIG. 5, for example, the first verification-object data [V_Data] is the data 327 of the same tree shown in FIG. 5. In this case, the collation data [P_Data] is a hash list 326, which comprises a plurality of hash values. In the case of a 2-branch data-management tree like the one shown in FIG. 5, every hash list comprises two hash values H (0) and H (1) indicated by hash-value indexes k of 0 and 1 respectively. One of the hash values H (0) and H (1) is selected as a collation hash value [P_Hash]. That is why a hash-value index k is acquired to be used as the verification-route definition information for selecting one of the hash values H (0) and H (1).

A hash-value index k used as information defining the verification route is also a value defining a verification route from a hierarchical layer at any specific level in the data-management tree to a hierarchical layer at a level directly above the specific level. In the case of a typical verification process carried out through the data-management tree shown in FIG. 5, for example, the values of the hash-value index k define a verification route connecting the verification-object data 327 to the top hash value 321 through hash lists 326, 325, 324, 323 and 322. The data verification process is carried out in the bottom-up direction on the basis of the hash lists existing in this verification route.

As described above, the values of the hash-value index k used as information defining the verification route define a verification route connecting the verification-object data D327 to the top hash value 321. As a result, since the values of the hash-value index k are set as a bottom-up sequence of 1, 1, 1, 0 and 0, the values define the same verification route as the one explained earlier by referring to the flowchart shown in FIG. 4.

Then, at the next step S205, on the basis of a hash-value index k used as information defining the verification route, a collation hash value [P_Hash] is selected from the hash values comprised in the collation hash list [P_Data] provided right above the verification-object data [V_Data] in accordance with the hash-value index k of the collation hash list [P_Data].

As described above, a verification route is determined on the basis of the tree structure and the eventual verification-object data provided on the hierarchical layer at the lowest level and the hash-value index k used as information defining the verification route is set at values representing the verification route. The verification route can be set by the CPU 102 employed in the data management apparatus 101 or the CPU 201 employed in the security chip 105.

Then, at the next step S206, the verification-object hash value [V_Hash] found as the hash value of the verification-object data [V_Data] is collated with the collation hash value [P_Hash] to determine whether or not the former matches the latter.

If the former does not match the latter, that is, if P_Hash≠V_Hash, the verification-object data [V_Data] is determined to be falsified data or a hash list comprising hash values found on the basis of falsified data. In this case, the flow of the procedure goes on to a step S210 at which the data verification process is ended in a failure.

If the result of the collation carried out at the step S206 indicates that the former matches the latter, that is, if P_Hash=V_Hash, on the other hand, the verification-object data [V_Data] is determined to be the true data or a hash list comprising no hash values found on the basis of falsified data.

If the validity of the verification-object data [V_Data] is verified as described above, the flow of the procedure goes on to a step S207 at which a verification-object hash value [V_Hash] is computed from the hash values comprised in the collation data [P_Data] and to be used as the next verification-object hash value [V_Hash].

To put it concretely, a verification-object hash value [V_Hash] of the collation data [P_Data] is computed on the basis of the hash values H (0) and H (1) comprised in the collation data [P_Data]. Typically, a hash algorithm such as SHA-1 is applied to data connecting the two hash values to find the verification-object hash value [V_Hash].

Then, at the next step S208, processing to determine the hierarchical-layer level of the data verification process is carried out. This processing is a process to determine whether or not L is equal to (m−1). To put it in detail, the processing to determine the hierarchical-layer level is a process to determine whether or not the verification-object hash value to be collated with a collation hash value this time is the verification-object hash value of verification-object data (or a hash list) on a hierarchical layer directly subordinate to the top hash value in the data-management tree, that is, whether or not the verification-object hash value to be collated with a collation hash value this time is the verification-object hash value of verification-object data (or a hash list) on the hierarchical layer (m−1) directly subordinate to the top hash value on the uppermost hierarchical layer m in the data-management tree having m hierarchical layers.

If L=(m−1), the flow of the procedure goes on to a step S211 at which the top hash value is used as the collation hash value [P_Hash]. Then, at the next step S212, the verification-object hash value [V_Hash] found as the hash value based on hash values comprised in the verification-object data [V_Data], which is a hash list provided on the hierarchical layer (m−1), is collated with the top hash value used as the collation hash value [P_Hash] to determine whether or not the former matches the latter. The processing carried out at this step is the last collation in the data verification process performed in the bottom-up direction. A result of the last collation indicating that the former matches the latter means that all the verifications carried out along the verification route starting with the data 327 on the hierarchical layer at the lowest level and ending with the last verification-object hash list 322 on the hierarchical layer (m−1) of the data-management tree shown in FIG. 5 are ended with positive collation results indicating matching of hash values. Thus, the data verification process has been successful. In this case, the flow of the procedure goes on to a step S213 at which the verification is ended normally. That is to say, the data verification process is ended by determining that there is no data falsification.

If the result of the collation carried out at the step S212 indicates that the former does not match the latter or P_Hash≠V_Hash, on the other hand, the verification-object data [V_Data] is determined to be falsified data or a hash list comprising hash values found on the basis of falsified data. In this case, the flow of the procedure goes on to the step S210 at which the data verification process is ended in a failure.

If the determination result obtained at the step S208 indicates that L is not equal to (m−1), on the other hand, a node remaining to be verified is determined to exist on a hierarchical layer at a higher level. In this case, the flow of the procedure goes on to a step S209 at which the hierarchical-layer identification L is updated as follows: L=L+1. That is to say, the hierarchical-layer identification L is updated by incrementing the value thereof by one.

Then, the flow of the procedure goes back to the step S204 to repeat the processing described above from this step. The processing described above is carried out repeatedly till the data verification process ends in a failure or the data verification process is completed successfully. In this way, the data verification process is carried out by repeated collations through a verification route traced in the bottom-up direction through the data-management tree. Finally, if the result of the collation carried out at the step S212 indicates that a verification-object hash value [V_Hash] found on the basis of the data on the hierarchical layer L (=m−1) used as verification-object data [V_Data] matches the top hash value, collations between pieces of data on all adjacent hierarchical layers in the data-management tree are considered to be successful, proving that there is no falsification of data. In this case, the flow of the procedure goes on to a step S213 at which the data verification process is completed normally. If a result of any collation of data on the verification route indicates that collated hash values do not match each other, on the other hand, the flow of the procedure goes on to the step S210 at which the data verification process is ended in a failure indicating an evidence of data falsification.

[5. Data Addition, Modification and Deletion]

Figure 7:
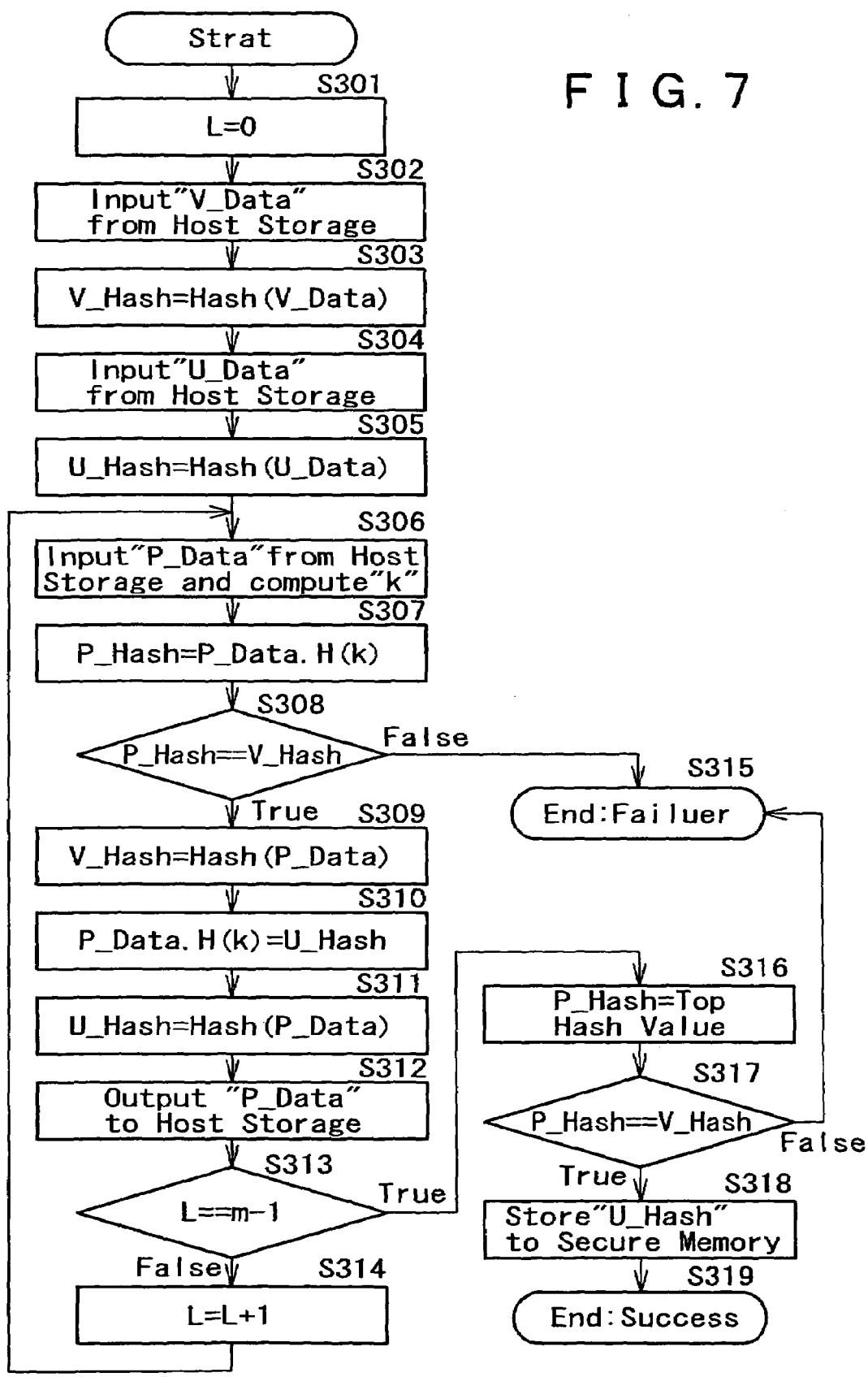
FIG. 7 shows a flowchart referred to in explaining the procedure of a process to update data and verify validity of the data on the basis of a data-management tree.

Next, data-updating processes comprising processing to add, change and delete management-object data are explained by referring to a flowchart shown in FIG. 7.

FIG. 7 shows a flowchart representing processing to add, change and delete management-object data such as a content, a license and charging data. If neither hash list nor management-object data exists as a subordinate to a hash value of a hash list, a hash value Hash (null) is used as the hash value. The hash value Hash (null) is a hash value for null, which has a size of 0. In addition, it is assumed that the processing to add, change or delete management-object data does not change the number of hierarchical layers comprising the data-management tree.

In the processing to add, change and delete data, certain data currently existing in the data-management tree is used as initial pre-updating data [V_Data] whereas data stored in the host storage unit 104 is used as initial post-updating data [U_Data] and registered in the data-management tree after the updating process.

Specially, in the processing to add data, the initial pre-updating data [V_Data] and the initial post-updating data [U_Data] are both management-object data or a hash list stored in the host storage unit 104. Since the initial pre-updating data [V_Data] actually does not exist, however, null data is used as the initial pre-updating data [V_Data].

In the case of the processing to change data, in particular, the initial pre-updating data [V_Data] and the initial post-updating data [U_Data] are both management-object data stored in the host storage unit 104.

Particularly, in the processing to delete data, the initial pre-updating data [V_Data] and the initial post-updating data [U_Data] are both management-object data or a hash list stored in the host storage unit 104. Since the initial post-updating data [U_Data] actually does not exist, however, null data having a size of 0 is used as the initial post-updating data [U_Data].

In the processing to add, change and delete data, a process to verify validity of hash lists in the data-management tree is also carried out at the same time. This is because, if a data-updating process not accompanied by a data verification process is permitted, it is quite within the bound of possibilities that data is falsified in the course of the processing to add, change and delete data. That is to say, in order to get out of the bound of possibilities that a hacker updates data in the data-management tree by setting arbitrary data in the tree, it is assumed that a process to verify validity of hash lists in the data-management tree is also carried out at the same time as the processing to add, change and delete data.

A process to verify validity of hash lists in the data-management tree can be carried out at the same time as the data-updating process comprising processing to add, change and delete data by adopting the top-down verification method starting from the hierarchical layer L at the highest level (L=m−1) of the data-management tree as is the case with the data verification process explained before by referring to the flowchart shown in FIG. 4, or the bottom-up verification method starting from the hierarchical layer L at the lowest level (L=0) of the data-management tree as is the case with the data verification process explained before by referring to the flowchart shown in FIG. 6. By adopting the bottom-up method to carry out the data verification process at the same time as the data-updating process, however, a memory can be utilized with a high degree of efficiency and the processing time can be shortened. FIG. 7 shows a flowchart representing the data verification process adopting the bottom-up verification method and the data-updating process carried out at the same time as the data verification process.

The data-updating processing comprising processes to add, change and delete data can be carried out under control executed by the CPU 102 employed in the data management apparatus 101 or the CPU 201 employed in the security chip 105. If the data-updating processing is carried out under control executed by the CPU 102 employed in the data management apparatus 101, the CPU 102 employed in the data management apparatus 101 acquires management-data verification values in advance from the secure memory 203 employed in the security chip 105 to be used as a basis for carrying out a data verification process. It is to be noted that management-data verification values comprise the top hash value of the data-management tree shown in FIG. 3. If the data-updating processing is carried out under control executed by the CPU 201 employed in the security chip 105, on the other hand, necessary information stored in the host storage unit 104 employed in the data management apparatus 101 is supplied to the security chip 105.

In order to prevent the data-updating processing from being carried out illegally, the processes to add, change and delete are carried out under control executed the CPU 201 employed in the security chip 105. In this configuration, the security chip 105 verifies the validity of pre-updating data [V_Data] and the validity of post-updating data [U_Data] or the security chip 105 generates the post-updating data [U_Data] itself.

Steps of the processing flowchart shown in FIG. 7 are explained as follows. The flowchart begins with a step S301 to initialize a variable L indicating a hierarchical layer in the data-management tree as a layer to which the pre-updating data [V_Data] pertains. That is to say, at this step, an initial value of the hierarchical-layer identification L is set at 0 indicating that the pre-updating data [V_Data] corresponds to management-object data on the hierarchical layer at the lowest level of the data-management tree. It is to be noted that, in the case of a process to add data, the pre-updating data [V_Data] does not exist as described above. In this case, it is assumed that the null data having a size of 0 is used as the pre-updating data [V_Data].

Then, at the next step S302, the pre-updating data [V_Data] is read out from the host storage unit 104. This pre-updating data [V_Data] is an object of a verification process based on a collation hash value [P_Hash] on a hierarchical layer at an immediately higher level of the data-management tree. To put it concretely, the collation hash value [P_Hash] is one of hash values comprised in a hash list provided on the hierarchical layer at the immediately higher level and is to be collated with a hash value generated on the basis of the pre-updating data [V_Data].

Generally speaking, the pre-updating data [V_Data] is a hash list (L, j) provided on a hierarchical layer L for L>0 where notation j denotes a hash-list index assigned to the hash list (L, j) provided on the hierarchical layer L. In the case of the hierarchical layer L at the lowest level, that is, in the case of L=0, on the other hand, the pre-updating data [V_Data] is management-object data D (dataID). In this example, management-object data D (dataID), which is management-object data to serve as an object of verification, is used as the initial verification-object data.

Then, at the next step S303, a hash value V_Hash is found by computation based on the pre-updating data [V_Data] acquired from the host storage unit 104 as a hash value of the pre-updating data [V_Data]. It is to be noted that, as described above, the algorithm for finding a hash value is an algorithm determined in advance. As an example thereof, the SHA-1 algorithm can be adopted.

Then, at the next step S304, post-updating data [U_Data] is read out from the host storage unit 104. The post-updating data [U_Data] is data for replacing the pre-updating data [V_Data]. It is to be noted that, in the case of a process to delete data, the post-updating data [U_Data] does not exist as described above. In this case, it is assumed that the null data having a size of 0 is used as the post-updating data [U_Data].

Then, at the next step S305, a hash value [U_Hash] is found by computation based on the post-updating data [U_Data] acquired from the host storage unit 104 as a hash value of the post-updating data [U_Data]. It is to be noted that, as described above, the algorithm for finding a hash value is an algorithm determined in advance. As an example thereof, the SHA-1 algorithm can be adopted.

Then, at the next step S306, a hash list HL comprising a collation hash value is read out from the host storage unit 104 to be used as collation data [P_Data] and a hash-value index k of the hash list HL is found as information defining an updating route.

The collation data [P_Data] is a hash list provided on a hierarchical layer at a higher level as a hash list directly linked to the pre-updating data [V_Data] serving as an object of verification. The collation data [P_Data] is a hash list having a plurality of hash values. In the case of a 2-branch data-management tree, the collation data [P_Data] has two hash values H [0] and H [1], one of which is selected as the collation hash value [P_Hash]. A hash-value index k is acquired as described above as the updating-route definition information for selecting one of the hash values H [0] and H [1].

Much like the verification-route definition value k described earlier, values of the hash-value index k acquired as the verification-route definition information define a route connecting the data to be updated to the top hash value.

Then, at the next step S307, a collation hash value [P_Hash] is selected from the two hash values H [0] and H [1] of the collation data [P_Data], which is a hash list provided on a hierarchical layer at an immediately higher level as a hash list directly linked to the pre-updating data [V_Data], on the basis of the hash-value index k acquired as the updating-route definition information.

As described above, a verification and updating route is determined on the basis of the tree structure as well as the updating-object and verification-object data. The updating route can be set by the CPU 102 employed in the data management apparatus 101 or the CPU 201 employed in the security chip 105.

Then, at the next step S308, the verification-object hash value [V_Hash] found as the hash value of the pre-updating data [V_Data] is collated with the collation hash value [P_Hash] to determine whether or not the former matches the latter.

If the former does not match the latter, that is, if P_Hash≠V_Hash, the pre-updating data [V_Data] is determined to be falsified data or a hash list comprising hash values found on the basis of falsified data. In this case, the flow of the procedure goes on to a step S315 at which the data verification/updating process is ended in a failure.

If the result of the collation carried out at the step S308 indicates that the former matches the latter, that is, if P_Hash=V_Hash, on the other hand, the pre-updating data [V_Data] is determined to be the true data or a hash list comprising no hash values found on the basis of falsified data.

If the validity of the pre-updating data [V_Data] is verified as described above, the flow of the procedure goes on to a step S309 at which a verification-object hash value [V_Hash] is computed from the hash values comprised in the collation data [P_Data] and to be used as the next verification-object hash value [V_Hash].

Then, at the next step S310, the post-updating hash value [U_Hash] is used for replacing the hash value P_Data.H(k) comprised in the hash list [P_Data] as the verification-object hash value [V_Hash], which was used in the collation at the step S308. To put it concretely, the hash value generated from the post-updating data [U_Data] by adoption of a predetermined algorithm such as SHA-1 is used as a new hash value P_Data.H(k) of the hash list [P_Data].

Then, at the next step S311, a hash value [U_Hash] of the post-updating hash list [P_Data] comprising the new hash value P_Data.H(k) is found by computation.

Subsequently, at the next step S312, the post-updating hash list [P_Data] comprising the new hash value P_Data.H(k) is stored in the host storage unit 104. At this point of time, however, the data-management tree is not updated.

The data management apparatus 101 keeps the post-updating hash list [P_Data] comprising the new hash value P_Data.H(k). Post-updating hash lists [P_Data], which are held at a point of time the last verification and updating sequence is completed normally, are used for updating relevant portions of the data-management tree in a process to update the data-management tree. If the last verification and updating sequence is not completed normally, on the other hand, the post-updating hash lists [P_Data] each held temporarily for a node of the data-management tree are discarded.

Then, at the next step S313, processing to determine the hierarchical-layer level of the data verification and updating process is carried out. This processing is a process to determine whether or not L is equal to (m−1). To put it in detail, the processing to determine the hierarchical-layer level is a process to determine whether or not the verification-object hash value to be collated with a collation hash value this time is the verification-object hash value of verification-object data (or a hash list) [V_Data] on a hierarchical layer directly subordinate to the top hash value in the data-management tree, that is, whether or not the verification-object hash value to be collated with a collation hash value this time is the verification-object hash value of verification-object data (or a hash list) [V_Data] on the hierarchical layer (m−1) directly subordinate to the top hash value on the uppermost hierarchical layer m in the data-management tree having m hierarchical layers.

If L=(m−1), the flow of the procedure goes on to a step S316 at which the top hash value is used as the collation hash value [P_Hash]. Then, at the next step S317, the verification-object hash value [V_Hash] found as the hash value based on hash values comprised in the verification-object data [V_Data], which is a hash list provided on the hierarchical layer (m−1), is collated with the top hash value used as the collation hash value [P_Hash] to determine whether or not the former matches the latter. The processing carried out at this step is the last collation in the data verification and updating process performed in the bottom-up direction. A result of the last collation indicating that the former matches the latter means that all the verifications carried out along the verification and updating route starting with the updating-object data on the hierarchical layer at the lowest level and ending with the last verification-object hash list directly subordinate to the top hash value are ended with positive collation results indicating matching of hash values. Thus, the data verification and updating process has been successful.

In this case, the flow of the procedure goes on to a step S318 at which the post-updating hash value [U_Hash] computed at the step S311 is stored in the secure memory 203 employed in the security chip 105. The post-updating hash value [U_Hash] computed at the step S311 is a top hash value [U_Hash] computed on the basis of hash values (comprising an updated hash value) of a hash list on the hierarchical layer at a level directly subordinate to the top hash value. Then, at the next step S319, the data verification and updating process is ended normally.

If the collation carried out at the step S317 produces a result indicating data mismatching, that is, if P_Hash≠V_Hash, on the other hand, the verification-object data [V_Data] is determined to be falsified data or a hash list comprising hash values found on the basis of falsified data. In this case, the flow of the procedure goes on to the step S315 at which the data verification/updating process is ended in a failure.

If the determination result obtained at the step S313 indicates that L is not equal to (m−1), on the other hand, a node remaining to be verified is determined to exist on a hierarchical layer at a higher level. In this case, the flow of the procedure goes on to a step S314 at which the hierarchical-layer identification L is updated as follows: L=L+1. That is to say, the hierarchical-layer identification L is updated by incrementing the value thereof by one.

Then, the flow of the procedure goes back to the step S306 to repeat the processing described above from this step. The processing described above is carried out repeatedly till the data verification process ends in a failure or the data verification process is completed successfully. In this way, the data verification process and the data-updating process are carried out by repeated collations and updating operations through a verification/updating route traced in the bottom-up direction through the data-management tree. Finally, at the step S318, the post-updating hash value [U_Hash] computed at the step S311 is stored in the secure memory 203 employed in the security chip 105. Then, at the next step S319, the data verification and updating process is ended normally. If a result of any collation of data on the verification/updating route in the data verification process and the data-updating process indicates that collated hash values do not match each other, on the other hand, the flow of the procedure goes on to the step S315 at which the processes are ended in a failure indicating an evidence of data falsification.

[6. Determination of a Verification Route]

In the data-verification or data-updating process carried out on a data-management tree as described above, the hash-value index k is used as a value for setting a data verification route or a data-updating route. A method for determining a data verification route or a data-updating route by using values of the hash-value index k is explained below. It is to be noted that a data verification route or a data-updating route can be determined by the CPU 102 employed in the data management apparatus 101 or the CPU 201 employed in the security chip 105.

(1): Route Determination in a Top-Down Process

The process to verify validity of management-object data D (dataID), which is management-object data having a data index x equal to dataID, is assumed to be a process starting from a hierarchical layer at the highest level of the data-management tree in a direction to hierarchical layers at lower levels. It is to be noted that, in the embodiment described above, the data-management tree is a 2-branch tree. In the following description, however, a route determination process is carried out on an n-branch data-management tree with every node having n branches where n is an arbitrary integer.

Figure 8:
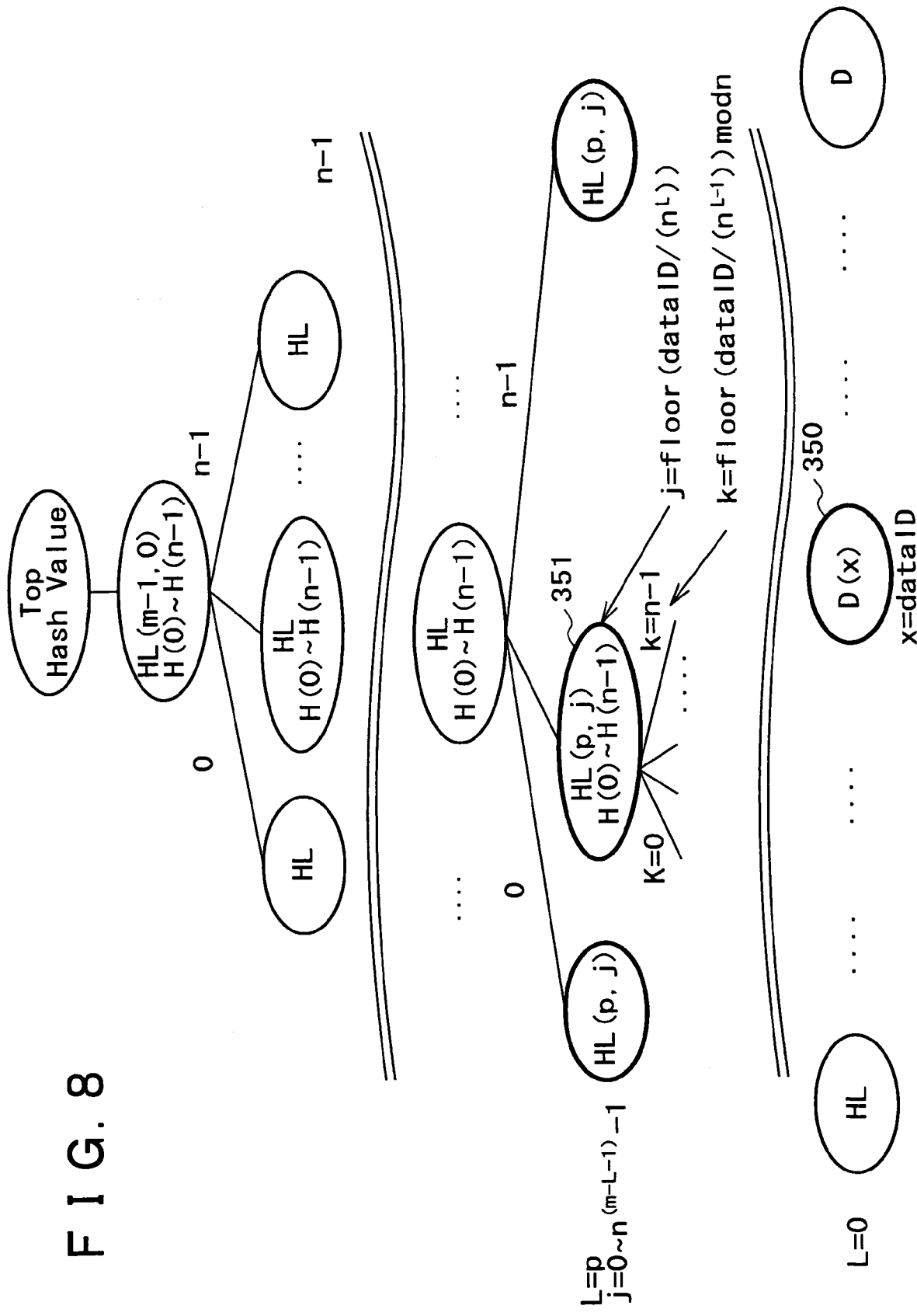
FIG. 8 is an explanatory diagram showing information required for setting a verification route.

As shown in FIG. 8, the data-management tree is assumed to have an n-branch structure in which every hash list has a hash-value count n and have a hierarchical-layer count m.

The data index x (=dataID) of eventual verification-object data 350 on a hierarchical layer at the lowest level L (=0) is known where notation L is a number assigned to a verification-object hierarchical layer of the data-management tree. The hierarchical-layer number L is an integer in the range 0 to (m−1). For a given hierarchical-layer number L, the hash-list index j assigned to every hash list on a hierarchical layer having the number L has a value in the range 0 to $n^{(m-L-1)}-1$.

In order to specify a hash list or data on a hierarchical layer L (=p) of the data-management tree shown in FIG. 8, a hash-list index j is assigned to the hash list (for L>0) or a data index x is assigned to the data (for L=0) respectively. For a given data index dataID of the eventual verification-object data 350 and a given hierarchical-layer number L, the hash-list index j assigned to a hash list or the data index x assigned to data can be found from the following equation:

$$j \text{ or } x = \text{floor}(\text{dataID}/(n^L)) \quad \text{(Eq. 1)}$$

where symbol dataID is the data index x of the eventual verification-object data and symbol L is the number assigned to the verification-object hierarchical layer on which the hash list or the data is provided.

In the above equation, floor (x) is a function returning the greatest integer that does not exceed x. Expression $x^y$ is x raised to the yth power and expression x/y is division of x by y. For L>0, Eq. (1) determines the hash-list index j of a verification-object hash list on a hierarchical layer L of the data-management tree. For L=0, in particular, Eq. (1) gives the data index x equal to dataID itself, which is the given data index assigned to the eventual verification-object data on the hierarchical layer at the lowest level in the data-management tree. In the case of the typical data-management tree shown in FIG. 8, for example, Eq. (1) is applied to a hierarchical layer L (=p, where p is a non-zero integer) to compute the value of the hash-list index j. As a result, a hash list 351 is selected.

In addition, in the execution of a verification process in the top-down direction through the data-management tree, the collation hash value [P_Hash] needs to be selected from a hash list, which is determined by the hash-list index j found as described above. In the above example, the hash list 351 shown in FIG. 8 is determined by the hash-list index j to be a hash list from which the collation hash value needs to be selected. Every hash list comprises n hash values where notation n denotes the number of branches. A hash-value index k assigned to every hash value has a value in the range 0 to (n−1).

Thus, it is also necessary to determine the hash-value index k. For eventual verification-object data having a data index x (=dataID), the hash-value index k of a verification-object hash list on a hierarchical layer L is determined in accordance with the following equation:

$$k = \text{floor}(\text{dataID}/n^{(L-1)}) \bmod n \quad \text{(Eq. 2)}$$

where L≠0.

In the above equation, floor (x) is a function returning the greatest integer that does not exceed x. Expression $x^y$ is x raised to yth power, expression x/y is division of x by y and expression 'x mod y' is a remainder obtained as a result of division of x by y. For L=0, the hash-value index k is irrelevant.

As described above, for a given data index x (=dataID) of eventual verification-object data and a given hierarchical layer L of the eventual verification-object data or a hash list, a hash-list index j or a data index x can be computed by using Eq. (1), whereas a hash-value index k for the hash list can be found from Eq. (2).

By finding hash-list indexes j or data indexes x and hash-value indexes k as described above, it is possible to determine a verification route from the top-level hierarchical layer L (=m−1) of the data-management tree to the eventual verification-object data on the bottom-level hierarchical layer L (=0). The process to verify validity of data is carried out on hash lists or data on this verification route.

It is to be noted that the process to update data is carried out while the process to verify validity of data is being executed. Thus, the route of the process to update data is determined in exactly the same way as the process to verify validity of data.

(2): Route Determination in a Bottom-Up Process

The process to verify validity of management-object data D (dataID), which is management-object data having a data index x equal to dataID, is assumed to be a process starting from a hierarchical layer at the lowest level of the data-management tree in a direction to hierarchical layers of higher levels. In the following description, a route determination process is carried out on an n-branch data-management tree with every node having n branches where n is an arbitrary integer.

The data-management tree in the following description is assumed to have an n-branch structure in which every hash list has a hash-value count n and have a hierarchical-layer count m.

The data index x (=dataID) of verification-object data on a hierarchical layer at the lowest level L (=0) is known where notation L is a number assigned to a verification-object hierarchical layer of the data-management tree. In the case of the bottom-up process, for verification-object data [V_Data] on a hierarchical layer L in the data-management tree, a hash list serving as collation data [P_Data] on a hierarchical layer (L+1) is identified, where the hierarchical-layer number L is an integer in the range 0 to (m−1). For a given hierarchical-layer number L in the range 1 to (m−1), the hash-list index j has a value in the range 0 to $n^{(m-L-1)}-1$.

In a process to determine a verification route in the bottom-up direction through the data-management tree, first of all, data having a dataID is identified on the basis of a given data index x (=dataID) assigned to the eventual verification-object data on the bottom-level hierarchical layer L (=0). It is then necessary to identify a hash list serving as collation data [P_Data] comprising a collation hash value [P_Hash] linked to the eventual verification-object data. The collation data [P_Data] or a hash list serving as the collation data [P_Data] are identified by computing a data index x of the collation data [P_Data] or a hash-list index j of the hash list respectively. For a given data index dataID of the eventual verification-object data and a given hierarchical-layer number L, the hash-list index j of a collation hash list used as collation data [P_Data] can be found from the following equation:

$$j = \text{floor}(\text{dataID}/(n^{(L+1)})) \quad \text{(Eq. 3)}$$

where symbol dataID is the data index x of the eventual verification-object data and symbol L (≠(m−1)) is the number assigned to the verification-object hierarchical layer on which the current verification-object data or the current verification-object hash list is provided.

In the above equation, floor (x) is a function returning the greatest integer that does not exceed x. Expression $x^y$ is x raised to the yth power and expression x/y is division of x by y. For L>0, Eq. (1) determines the hash-list index j of a collation hash list used as collation data [P_Data] on a hierarchical layer (L+1) immediately above the hierarchical layer L of the data-management tree. For L=0, on the other hand, Eq. (3) determines the hash-list index j of a collation hash list used as collation data [P_Data] on the hierarchical layer immediately above the lowest-level hierarchical layer in the data-management tree.

In addition, in the execution of a verification process in the bottom-up direction through the data-management tree, the collation hash value [P_Hash] needs to be selected from a hash list, which is determined by the hash-list index j found as described above. Every hash list comprises n hash values where notation n denotes the number of branches. A hash-value index k assigned to every hash value has a value in the range 0 to (n−1).

Thus, it is also necessary to find a hash-value index k in order to determine a collation hash value [P_Hash]. For eventual verification-object data having a data index x (=dataID) and a hierarchical layer L comprising the verification-object data [V_Data], the hash-value index k of a verification-object hash list is determined in accordance with the following equation:

$$k = \text{floor}(\text{dataID}/n^L) \bmod n \quad \text{(Eq. 4)}$$

where L≠(m−1).

In the above equation, floor (x) is a function returning the greatest integer that does not exceed x. Expression $x^y$ is x raised to yth power, expression x/y is division of x by y and expression 'x mod y' is a remainder obtained as a result of division of x by y.

For L=(m−1), the top hash value is used as the collation hash value [P_Hash]. Thus, in a data management apparatus 101 wherein the security chip 105 compares the verification-object data [V_Data] with top hash value stored in the secure memory 203 employed in the security chip 105, it is not necessary to supply the collation hash value [P_Hash] to the security chip 105 so that the process to determine a hash list accordance with Eq. (3) and a hash value comprised in the hash list in accordance with Eq. (4) can be eliminated.

As described above, for a given data index x (=dataID) of eventual verification-object data and a given hierarchical layer L of the eventual verification-object data or a hash list, a hash-list index j or a data index x can be computed by using Eq. (3), whereas a hash-value index k can be found from Eq. (4).

By finding hash-list indexes j or data indexes x and hash-value indexes k as described above, it is possible to determine a verification route from the eventual verification-object data on the bottom-level hierarchical layer L (=0) to the top-level hierarchical layer L (=m−1) of the data-management tree. The process to verify validity of data is carried out on hash lists or data on this verification route.

It is to be noted that the process to update data is carried out while the process to verify validity of data is being executed. Thus, the route of the process to update data is determined in exactly the same way as the process to verify validity of data.

It is also worth noting that, in the data management apparatus 101 where the CPU 102 determines a verification route by using one of the route determination methods described above, verification-object data (or a verification-object hash list) to be supplied to the security chip 105 is determined on the basis of the verification-object hierarchical layer L of the data-management tree and the index j assigned to the verification-object data (or the verification-object hash list) on the verification-object hierarchical layer L. In addition, a hash value is selected from those comprised in the verification-object hash list on the basis of a hash-value index k. Then, the determined verification-object data (or the determined verification-object hash list) or the selected hash value is read out from the host storage unit 104 and supplied to the security chip 105 to be used in a verification process carried out by the security chip 105.

If the security chip 105 determines the verification route, on the other hand, data position information determined on the basis of Eqs. (1) to (4) is supplied to the CPU 102 employed in the data management apparatus 101. Then, on the basis of the data position information supplied by the security chip 105, the CPU 102 employed in the data management apparatus 101 reads out the verification-object data (or the verification-object hash list) or the selected hash value from the host storage unit 104 and supplies it to the security chip 105 to be used in a verification process carried out by the security chip 105.

[7. Data-Management Tree Having One Hash-List Hierarchical Layer]

The embodiment described above has a typical configuration using a data-management tree comprising hash lists provided on a plurality of hierarchical layers at different levels. The following description explains a configuration comprising only one hash-list hierarchical layer, and processing carried out in such a configuration. That is to say, the number of hash-list hierarchical layers in the data-management tree is one. In such a data-management tree, the hierarchical-layer count m is two because the tree comprises a data hierarchical layer directly subordinate to the hash-list hierarchical layer.

Figure 9:
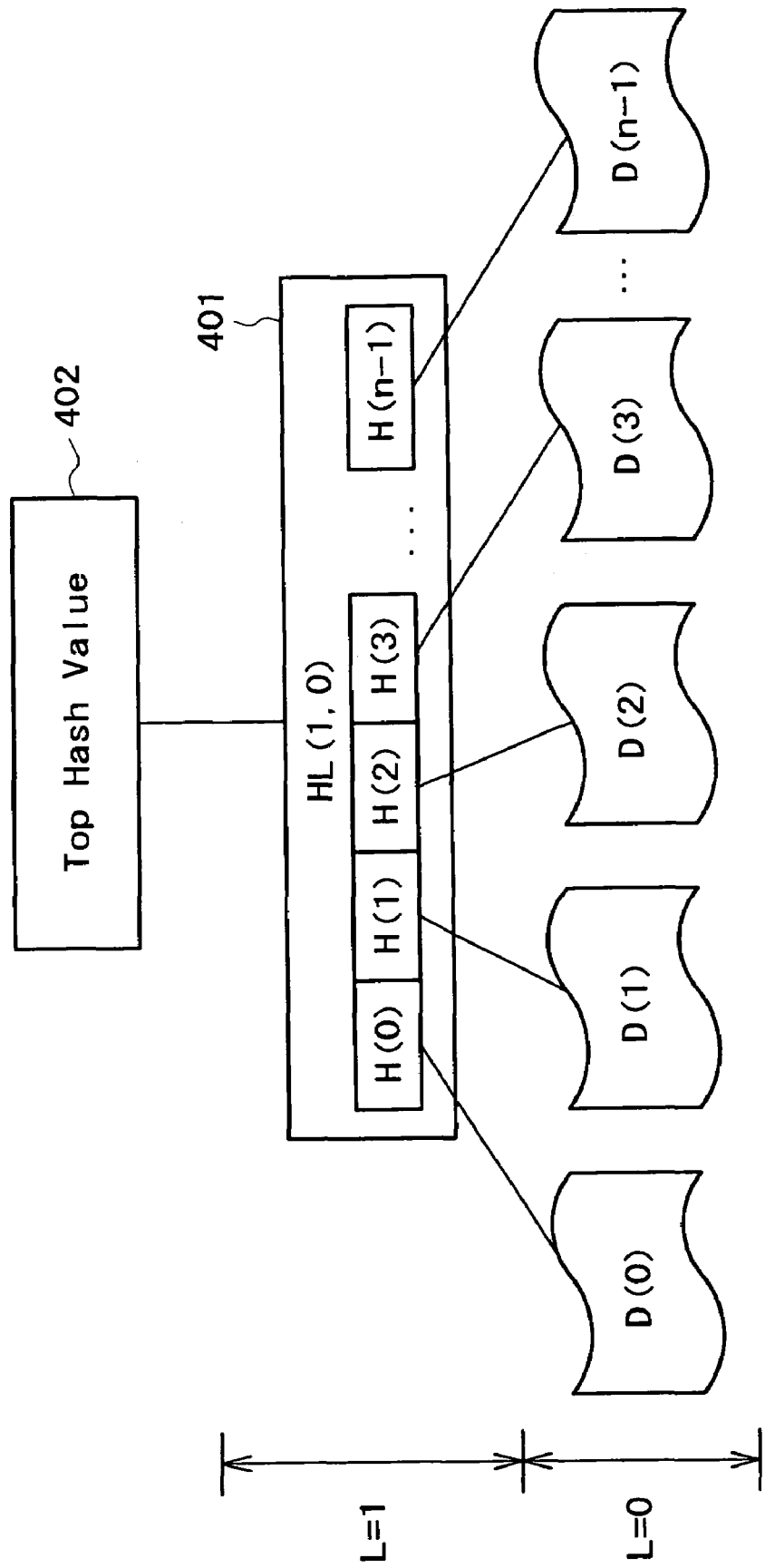
FIG. 9 is a diagram showing the configuration of a data-management tree including only one hierarchical layer of hash lists.

FIG. 9 is a diagram showing a typical configuration of the data-management tree with a hierarchical-layer count m of two and a management-data count n. In the case of the data-management tree having such a typical configuration, there is only one hash list HL (1, 0) denoted by reference numeral 401 comprising hash values of all pieces of management-object data.

The top hash value 402 is the hash value of the hash list HL (0, 1) 401. That is to say, the top hash value 402 is the hash value generated on the basis of n hash values comprised in the hash list HL (0, 1) 401. Typically, the top hash value 402 is the hash value generated by applying a hash algorithm such as SHA-1 to data linking the n hash values comprised in the hash list HL (0, 1) 401.

The secure memory 203 employed in the security chip 105 contains at least the top hash value 402 as a management-data verification value. Other data such as the hash list 401 and pieces of management-object data D (0) to D (n−1) on the hierarchical layer at the lowest level is stored in the host storage unit 104 employed in the data management apparatus 101.

[8. Increasing and Decreasing Hierarchical Layers]

Next, a process to increase and decrease the number of hierarchical layers in the data-management tree is explained. When the number of hierarchical layers in the data-management tree is increased or decreased, it is necessary to update management-data verification values stored in the secure memory 203 employed in the security chip 105.

The process to increase and decrease the number of hierarchical layers in the data-management tree can be carried out under control executed by the CPU 102 employed in the data management apparatus 101 or the CPU 201 employed in the security chip 105. If the process to increase and decrease the number of hierarchical layers in the data-management tree is carried out under control executed by the CPU 102 employed in the data management apparatus 101, the CPU 102 employed in the data management apparatus 101 acquires management-data verification values in advance from the secure memory 203 employed in the security chip 105 to be used as a basis for carrying out a data verification process. It is to be noted that management-data verification values comprise the top hash value located on the top of the data-management tree as shown in FIG. 3. If the process to increase and decrease the number of hierarchical layers in the data-management tree is carried out under control executed by the CPU 201 employed in the security chip 105, on the other hand, necessary information stored in the host storage unit 104 employed in the data management apparatus 101 is supplied to the security chip 105. In addition, information updated in the process to increase and decrease the number of hierarchical layers in the data-management tree is input from the security chip 105 to the host storage unit 104 employed in the data management apparatus 101.

(1): Process to Increase Hierarchical layers

Figure 10:
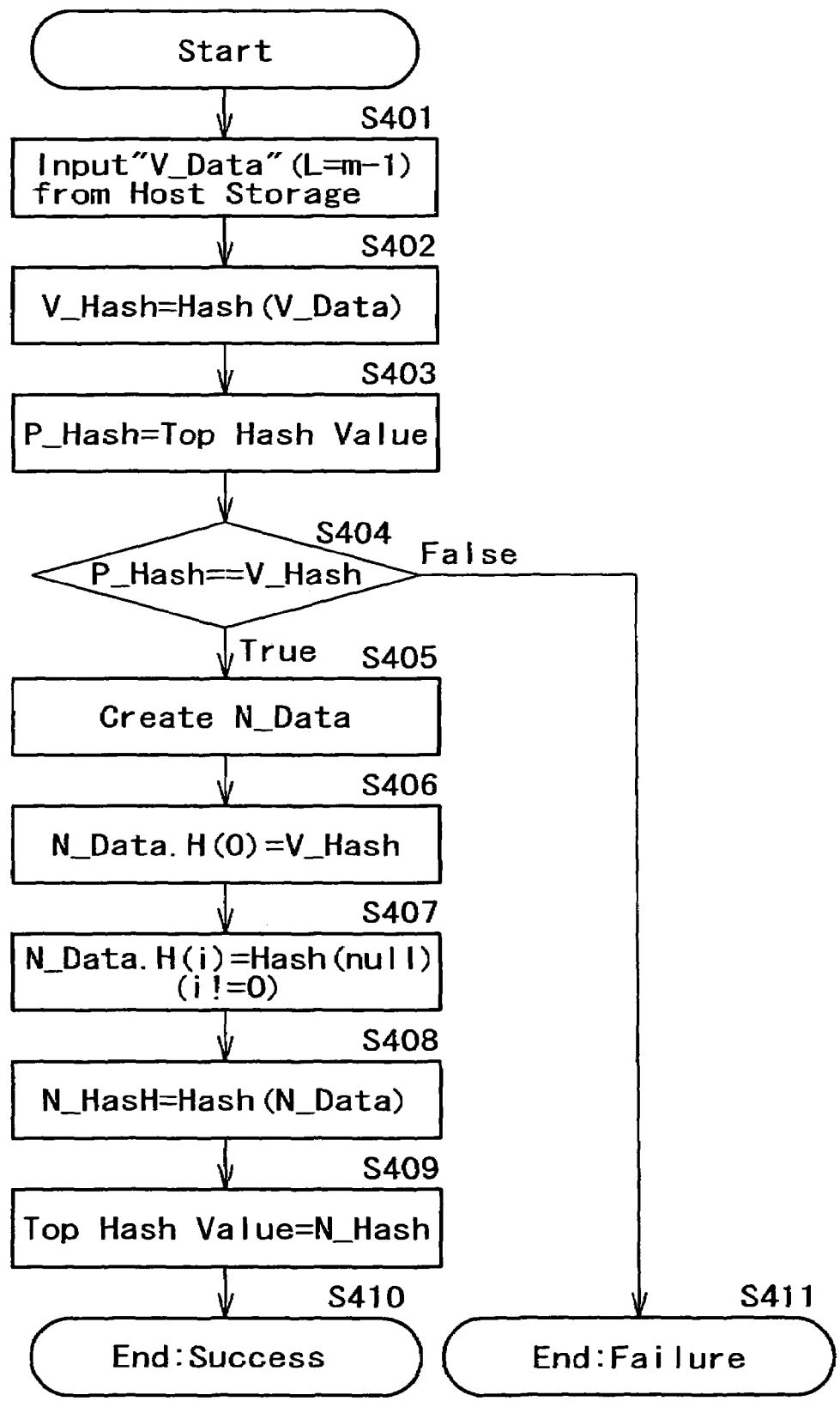
FIG. 10 shows a flowchart referred to in explaining the procedure of a process to increase the number of hierarchical layers in a data-management tree.

First of all, the procedure of processing to increase the number of hierarchical layers in the data-management tree is explained by referring to a flowchart shown in FIG. 10. The flowchart begins with a step S401 at which hash lists directly linked to the top hash value of the data-management tree are acquired from the host storage unit 104 as verification-object data [V_Data].

Then, at the next step S402, a hash value is found by computation based on the verification-object data [V_Data] acquired from the host storage unit 104 as a verification-object hash value [V_Hash]. It is to be noted that, as described above, the algorithm for finding a hash value is an algorithm determined in advance. As an example thereof, the SHA-1 algorithm can be adopted.

Then, at the next step S403, a collation hash value [P_Hash] is determined as a hash value to be compared with a hash value of the verification-object data. In this case, the top hash value stored in the security chip 105 as a management-data verification value is taken as the collation hash value [P_Hash].

Subsequently, at the next step S404, the verification-object hash value [V_Hash] found as the hash value of the verification-object data [V_Data] is collated with the collation hash value [P_Hash] to determine whether or not the former matches the latter.

If the former does not match the latter, that is, if P_Hash≠V_Hash, the verification-object data [V_Data] is determined to be falsified data or a hash list comprising hash values found on the basis of falsified data. In this case, the flow of the procedure goes on to a step S411 at which the process is ended in a failure.

If the result of the collation carried out at the step S404 indicates that the former matches the latter, that is, if P_Hash=V_Hash, on the other hand, the verification-object data [V_Data] is determined to be the true data or a hash list comprising no hash values found on the basis of falsified data.

Figure 11:
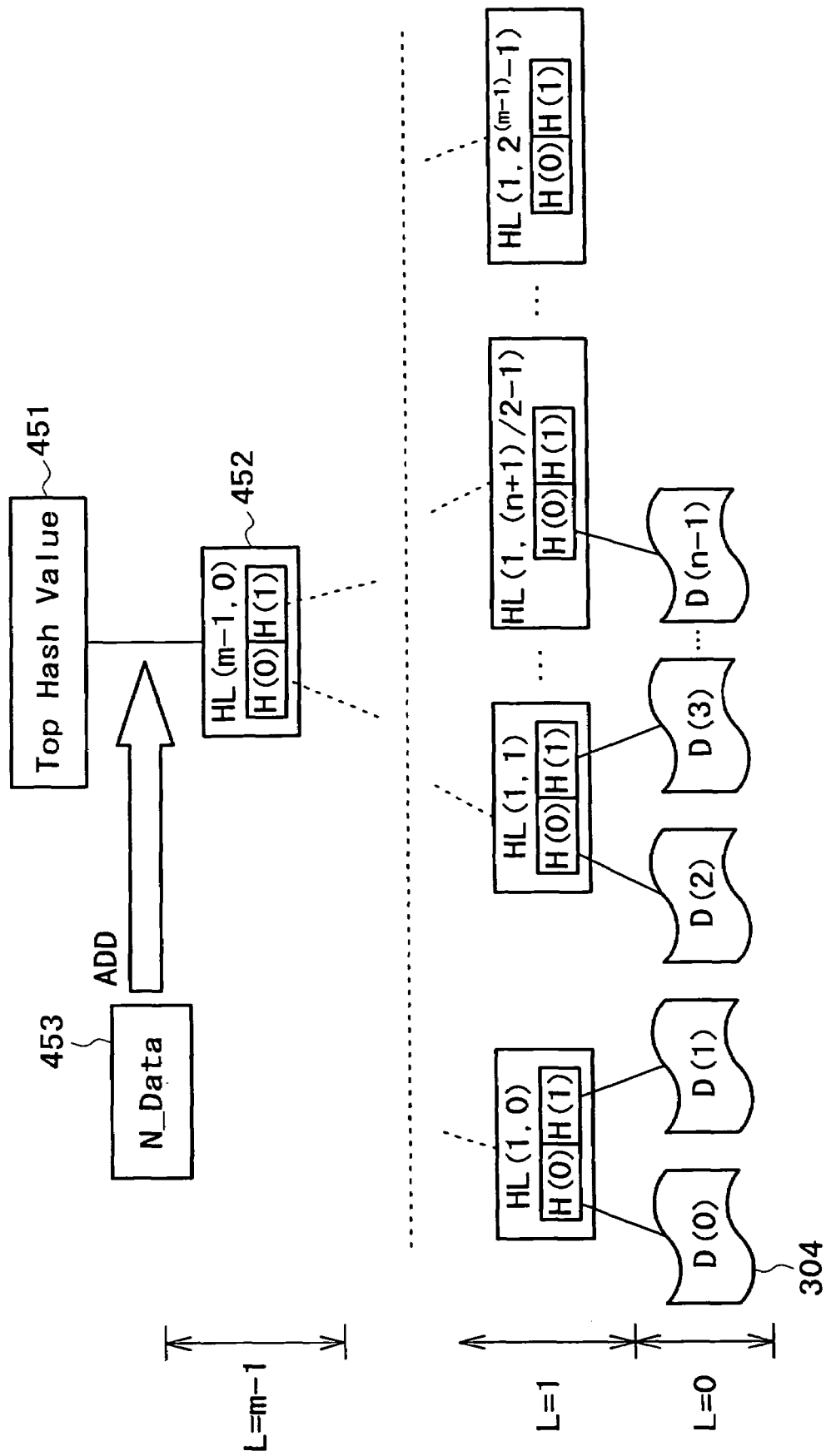
FIG. 11 is an explanatory diagram referred to in explanation of a process to increase the number of hierarchical layers in a data-management tree.

In this case, the flow of the procedure goes on to a step S405 at which a new hash list N_Data is generated on a hierarchical layer at the highest level m directly above the hash list completing the verification process. To put it concretely, the newly set hash list N_Data 453 is generated on a hierarchical layer between the hierarchical layer of the hash list 452 completing the verification process and the top hash value 451 as shown in FIG. 11.

Then, at the next step S406, a hash value [V_Hash] of the hash list 452 completing the verification process is set as one of hash values of the newly set hash list N_Data 453. Subsequently, at the next step S407, pieces of null data each having a size of 0 are set as the other hash values Hash (null) of the newly set hash list N_Data 453. In the case of an n-branch data-management tree, a hash list comprises n hash values. Thus, the newly set hash list N_Data 453 comprises the hash value [V_Hash] of the hash lists 452 completing the verification process and (n−1) other hash values Hash (null).

Then, at the next step S408, a hash value N_Hash based on hash values of the newly set hash list N_Data 453 is computed. To put it concretely, a hash algorithm such as SHA-1 is typically applied to data linking the hash values [V_Hash] of the hash list 452 completing the verification process and the (n−1) other hash values Hash (null) in a hash-value computation process to compute the hash value N_Hash.

Then, at the next step S409, the computed hash value N_Hash is used for replacing the top hash value. The computed hash value N_Hash will be used by the security chip 105 as a new management-data verification value. That is to say, the computed hash value N_Hash is stored in the secure memory 203 as an updated top hash value. Finally, at the next step S410, the process is ended normally.

(2): Process to Decrease Hierarchical Layers

Figure 12:
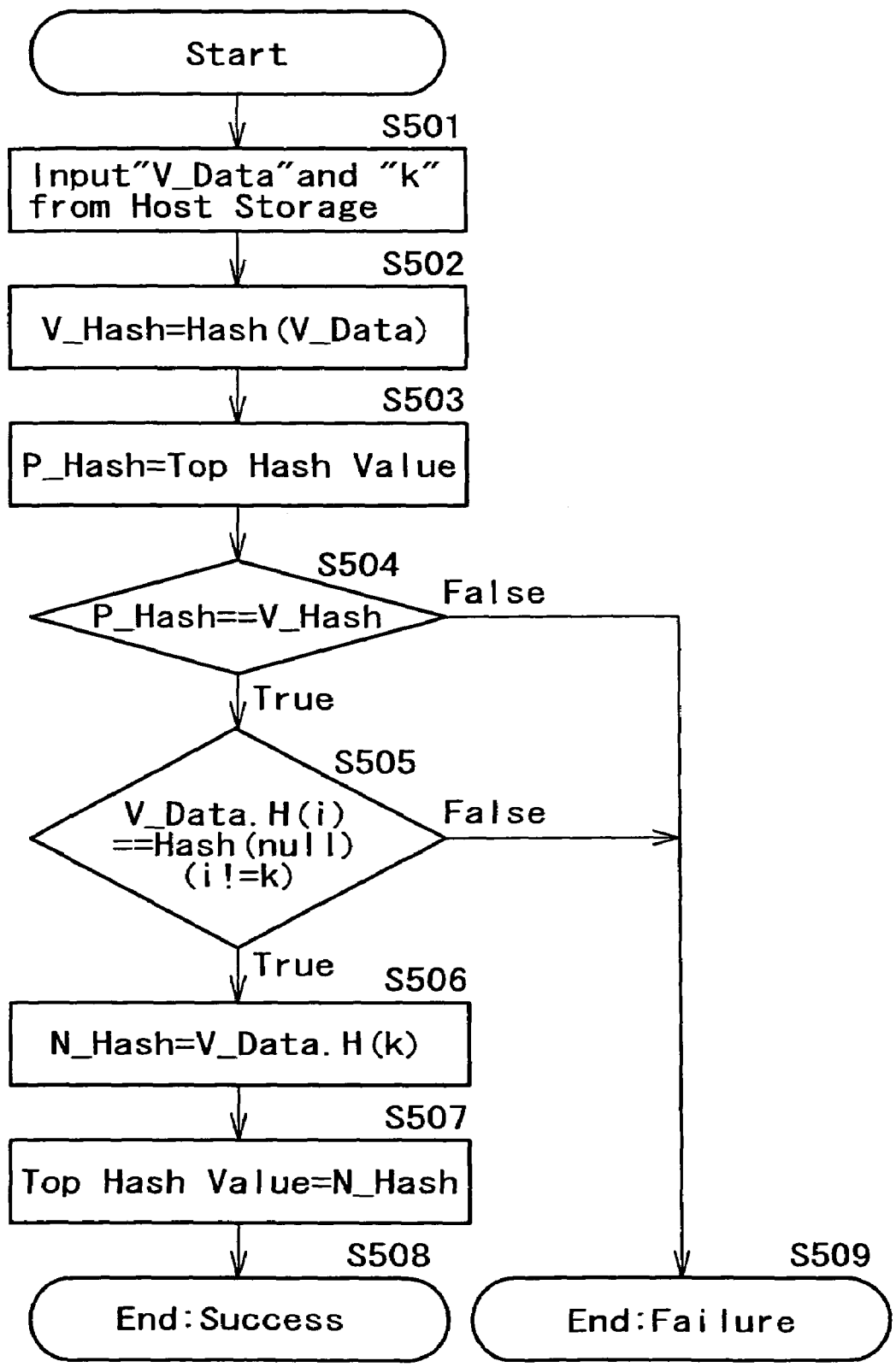
FIG. 12 shows a flowchart referred to in explaining the procedure of a process to decrease the number of hierarchical layers in a data-management tree.

Next, the procedure of processing to decrease the number of hierarchical layers in the data-management tree is explained by referring to a flowchart shown in FIG. 12. The flowchart begins with a step S501 at which a hash list directly linked to the top hash value of the data-management tree is acquired from the host storage unit 104 as verification-object data [V_Data].

Figure 13:
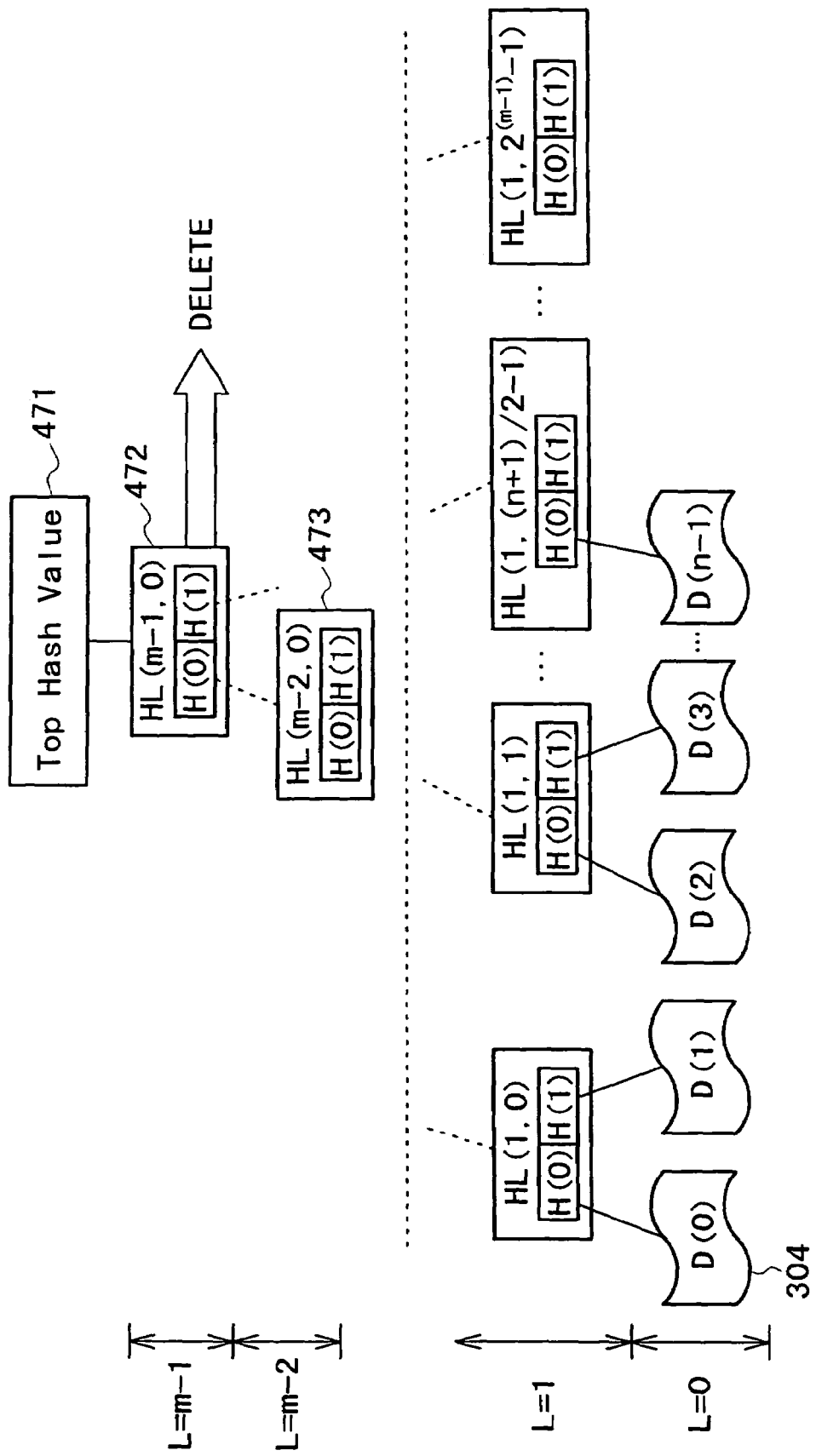
FIG. 13 is an explanatory diagram referred to in explanation of a process to decrease the number of hierarchical layers in a data-management tree.

In this case, the verification-object data [V_Data] is a hash list 472 located on a hierarchical layer at the highest level of the data-management tree as shown in FIG. 13. This hash list 472 on a hierarchical layer at the highest level of the data-management tree and the hierarchical layer thereof are deleted in this process to reduce the number of hierarchical layers in the tree by one.

As a result of deleting this hash list 472 and the hierarchical layer thereof, another hierarchical layer directly subordinate to the deleted hierarchical layer will be newly put at the highest level and a specific hash list 473 on the other hierarchical layer will get directly linked to the top hash value 471. For this reason, at the step S501, the hash-value index k of a hash value in the hash list 472 now at the highest level needs to be found. The hash-value index k is the hash-value index assigned to a hash value comprised in the verification-object data [V_Data] 472 as a hash value linked to the specific hash list 473 to serve as the hash list on the new hierarchical layer at the highest level having the hierarchical-layer count m is decremented by one.

Then, at the next step S502, a hash value is found by computation based on the verification-object data [V_Data] acquired from the host storage unit 104 as a verification-object hash value [V_Hash]. It is to be noted that, as described above, the algorithm for finding a hash value is an algorithm determined in advance. As an example thereof, the SHA-1 algorithm can be adopted.

Then, at the next step S503, a collation hash value [P_Hash] is determined as a hash value to be compared with the hash value [V_Hash] of the verification-object data [V_Data]. In this case, the top hash value stored in the security chip 105 as a management-data verification value is used as the collation hash value [P_Hash].

Subsequently, at the next step S504, the verification-object hash value [V_Hash] found as the hash value of the verification-object data [V_Data] is collated with the collation hash value [P_Hash] to determine whether or not the former matches the latter.

If the former does not match the latter, that is, if P_Hash≠V_Hash, the verification-object data [V_Data] is determined to be falsified data or a hash list comprising hash values found on the basis of falsified data. In this case, the flow of the procedure goes on to a step S509 at which the process is ended in a failure.

If the result of the collation carried out at the step S504 indicates that the former matches the latter, that is, if P_Hash=V_Hash, on the other hand, the verification-object data [V_Data] is determined to be the true data or a hash list comprising no hash values found on the basis of falsified data.

In this case, the flow of the procedure goes on to a step S505 to determine whether or not hash values of the hash list 472, which is the verification-object data [V_Data] to be deleted, are each a hash (null). The hash values are all the n hash values comprised in the hash list 472 except the hash value indicated by the hash-value index k found at the step S501. The hash value indicated by the hash-value index k is a hash value linked to the other hash list on another hierarchical layer to be newly put at the highest level. The hash (null) cited above is a hash value representing null data having a size of 0.

In the particular data-management tree shown in FIG. 13, the other hash list on the other hierarchical layer to be newly put at the highest level is a hash list 473, and the hash-value index k indicating a hash value, which is comprised in the hash list 472 to be deleted and linked to the hash list 473, has a value of 0. Thus, at the step S505, other hash values comprised in the hash list 472 as hash values each indicated by a hash-value index k other than 0 are examined to determine whether or not these other hash values are each a hash (null). In this case, k=1 is the only hash-value index k other than 0. This is because the particular data-management tree shown in FIG. 13 is a 2-branch data-management tree in which every hash list comprises only two hash values. In the case of an n-branch data-management tree, in general, every hash list comprises n hash values.

If the hash values of the hash list to be deleted except the hash value linked to the other hash list on another hierarchical layer to be newly put at the highest level comprise even one non-null hash value, the flow of the procedure goes on to the step S509 at which the process is ended in a failure without deleting the hash list on the current hierarchical layer at the highest level.

If the hash values of the hash list to be deleted except the hash value linked to the other hash list on another hierarchical layer to be newly put at the highest level are each a null hash value, a hash value N_Hash is computed on the basis of hash values comprised in the hash list V_Data on a hierarchical layer to be raised to the highest level after the number of hierarchical layers is reduced by one. In the particular data-management tree shown in FIG. 13, the hash list V_Data on a hierarchical layer to be raised to the highest level is the hash list 473, which is indicated by the hash-value index k of the hash value comprised in the hash list 472 to be deleted.

Then, at the next step S507, the computed hash value N_Hash is used as a management-data verification value replacing the top hash value in the security chip 105 and stored in the secure memory 203 as a new top hash value. Finally, the flow of the procedure goes on to a step S508 at which the process is ended normally.

[9. Encryption and Decryption of Management-Object Data]

As described earlier, data serving as objects of management is placed on a hierarchical layer at the bottom level of the data-management tree and managed by setting hash lists on hierarchical layers at higher levels of the tree. The data serving as objects of management comprises various kinds of data such as a content, a license and charging data. In order to prevent these kinds of data from leaking, it is desirable to encrypt the data in the data management apparatus 101 and store it in the host storage unit 104.

A key used in processes to encrypt and decrypt the management-object data is stored in the secure memory 203 employed in the security chip 105. This key is referred to hereafter as a storage key. Either the CPU 102 employed in the data management apparatus 101 or the CPU 201 employed in the security chip 105 can encrypt and decrypt management-object data by using the storage key.

If the processes to encrypt and decrypt the management-object data are carried out by the CPU 102 employed in the data management apparatus 101, the storage key is input from the security chip 105 and used in the processes. The CPU 102 employed in the data management apparatus 101 encrypts and decrypts management-object data by executing an encryption program stored in the host storage unit 104 in advance. If the CPU 201 employed in the security chip 105 encrypts and decrypts management-object data, on the other hand, the security chip 105 must have an encryption and decryption processing capability.

It is to be noted that the object of the encryption process is a portion or all of management-object data, which is the substance of data such as a content. As a matter of fact, the object of the encryption process can be data having a variety of configurations comprising a hash list. It is possible to provide a configuration in which a process to determine an object of the encryption process can be carried out by the CPU 102 employed in the data management apparatus 101 or the CPU 201 employed in the security chip 105 in accordance with an algorithm set internally in the data management apparatus 101 or the security chip 105 respectively.

In addition, it is also possible to provide a configuration in which a plurality of storage keys is stored in the secure memory 203 employed in the security chip 105. Further, it is also possible to provide a configuration in which a plurality of storage keys is generated or deleted in the secure memory 203 employed in the security chip 105. It is desirable to provide a plurality of storage keys and properly change a storage key in use in order to prevent the used storage key from being leaked and, hence, to enhance safety.

On the top of that, it is also possible to provide a configuration in which, a method to enhance safety is adopted as a technique to encrypt as well as decrypt an envelop key by using a storage key stored in the security chip 105, and to encrypt as well as decrypt management-object data by using the envelop key, and the envelop key encrypted by using a storage key is attached to the management-object data encrypted by using the envelop key. Thus, in this configuration, the amount of information known by a hacker as information on a storage key can be decreased and the risk of leaking the storage key can thus be reduced. It is to be noted that either the CPU 102 employed in the data management apparatus 101 or the CPU 201 employed in the security chip 105 can carry out the processing to encrypt as well as decrypt an envelop key by using a storage key stored in the security chip 105, and to encrypt as well as decrypt management-object data by using the envelop key. In the case of a configuration in which a decryption process is carried out to generate an envelop key by using a storage key stored in the secure memory 203 employed in the security chip 105 and the generated envelop key is output to a component outside the security chip 105, it is no longer necessary to output the storage key to a component outside the security chip 105 and the safety can thus be enhanced.

It is to be noted that, if stored data is changed by an encryption process, a process to update the data-management tree is carried out to accompany a data verification process in the same way as the data-updating process described earlier. After the process to update the data-management tree, the updated data is stored in the host storage unit 104 whereas a new top hash value is stored in the secure memory 203 employed in the security chip 105. The pre-encryption data can be obtained by decrypting the decrypted data provided that the verification process described earlier verifies the completeness and the most-recentness of the management-object data, raising no problem. Thus, if necessary, the confidentiality of data can be assured in addition to the verification of the completeness and the most-recentness.

As described above, in the configuration, management-object data is encrypted, the encrypted management-object data is stored and data management is executed by using a data-management tree set on the basis of the encrypted management-object data. Further, it is provide a configuration in which a key for using encryption process is stored in the security chip 105. Thus, the management-object data can be effectively prevented from being leaked.

[10. Verification Using Intermediate Hierarchical Layer Hash List]

As explained in the above description of the embodiment, at least, the top hash value is stored as a management-data verification value in the secure memory 203 employed in the security chip 105. By also storing a hash list on a hierarchical layer at an intermediate level of the data-management tree or hash values of such a hash list in the secure memory 203 employed in the security chip 105, the time it takes to carry out a process to verify validity of specific data can be shortened. The following description explains a data-management configuration in which a hash list on a hierarchical layer at an intermediate level of the data-management tree or hash values of such a hash list are stored in the secure memory 203 employed in the security chip 105 to be used in a data verification process.

Figure 14:
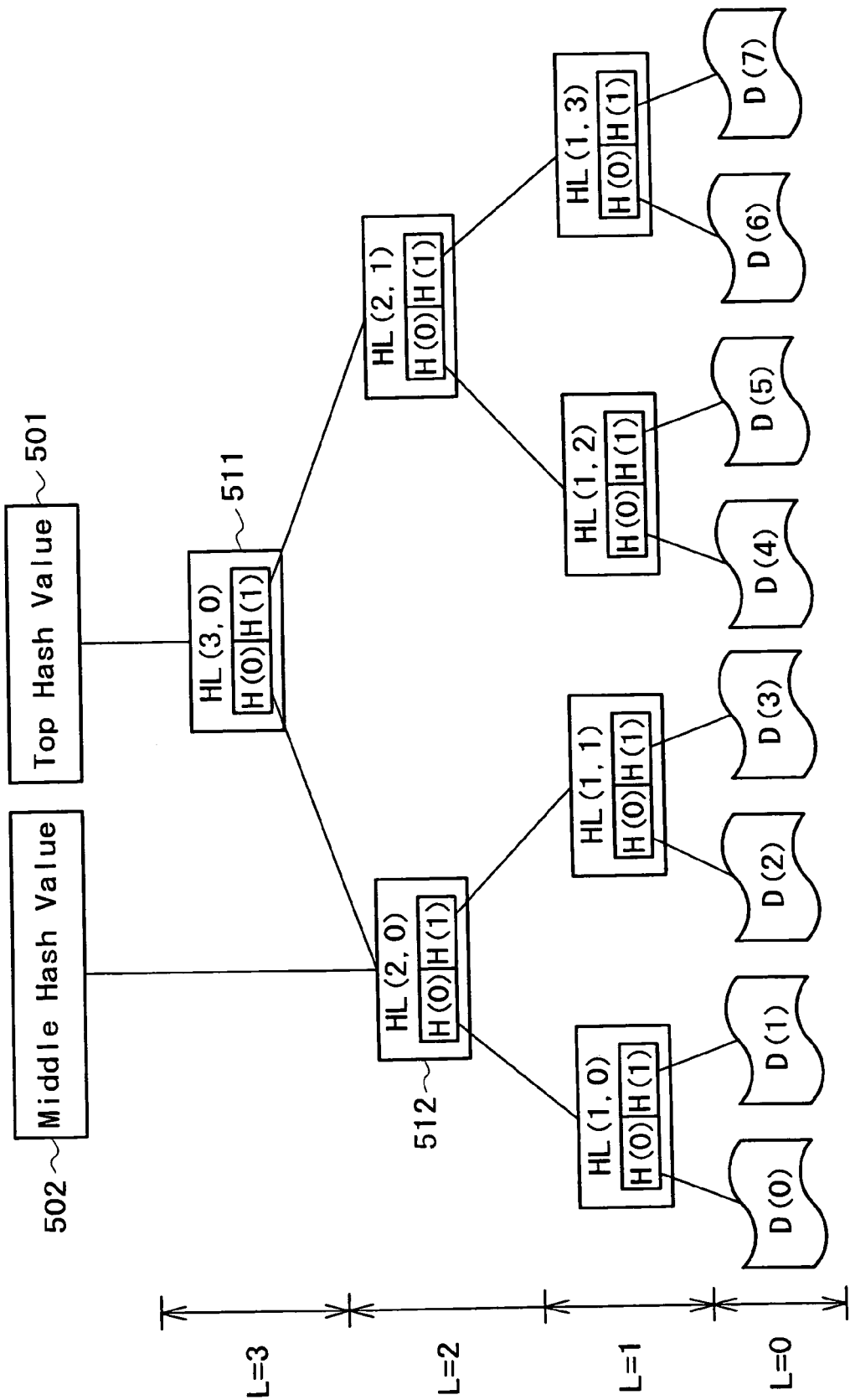
FIG. 14 is an explanatory diagram referred to in explanation of a process based on middle hash values.

FIG. 14 is a diagram showing a data-management tree having a structure of a 2-branch tree and a hierarchical-layer count m of 4. As described earlier, in a 2-branch data-management tree, every hash list comprises two hash values. The secure memory 203 employed in the security chip 105 is used for storing a top hash value 501 and a middle hash value 502 as management-data verification values. The middle hash value 502 is a hash value of a hash list HL (2, 0) on a hierarchical layer at an intermediate level of the data-management tree.

The top hash value 501 is a hash value generated on the basis of hash values of a hash list 511 on a hierarchical layer L (=3) at the highest level. On the other hand, the middle hash value 502 is a hash value generated on the basis of hash values of a hash list 521 on a hierarchical layer L (=2) at an intermediate level.

On the hierarchical layer L (=0) at the lowest level of the data-management tree shown in FIG. 14, there are eight pieces of management-object data D (0) to D (7). Each of the four pieces of management-object data D (0) to D (3) among these pieces of management-data can be verified by using the middle hash value 502.

By carrying out a verification process using the middle hash value 502, the process can be completed by verification with respect to only hash lists of two hierarchical layers, namely, the hierarchical layers L (=1 and 2). Thus, the time it takes to carry out a process to verify validity of the data can be shortened. By the same token, the time it takes to carry out a data-updating process such as the processing to add, change and delete a hierarchical layer can also be shortened as well. It is to be noted that the top hash value 501 is required in a process to verify validity of each of the four pieces of management-object data D (4) to D (7). This is because the process can be completed by verification with respect to hash lists of all the three hierarchical layers, namely, the hierarchical layers L (=1, 2 and 3).

[11. Management Configuration Based on a Plurality of Data-Management Trees]

In addition, by providing a configuration in which a plurality of management-data verification values is stored in the secure memory 203 employed in the security chip 105, as many data-management trees as the management-data verification values can be managed.

Figure 15:
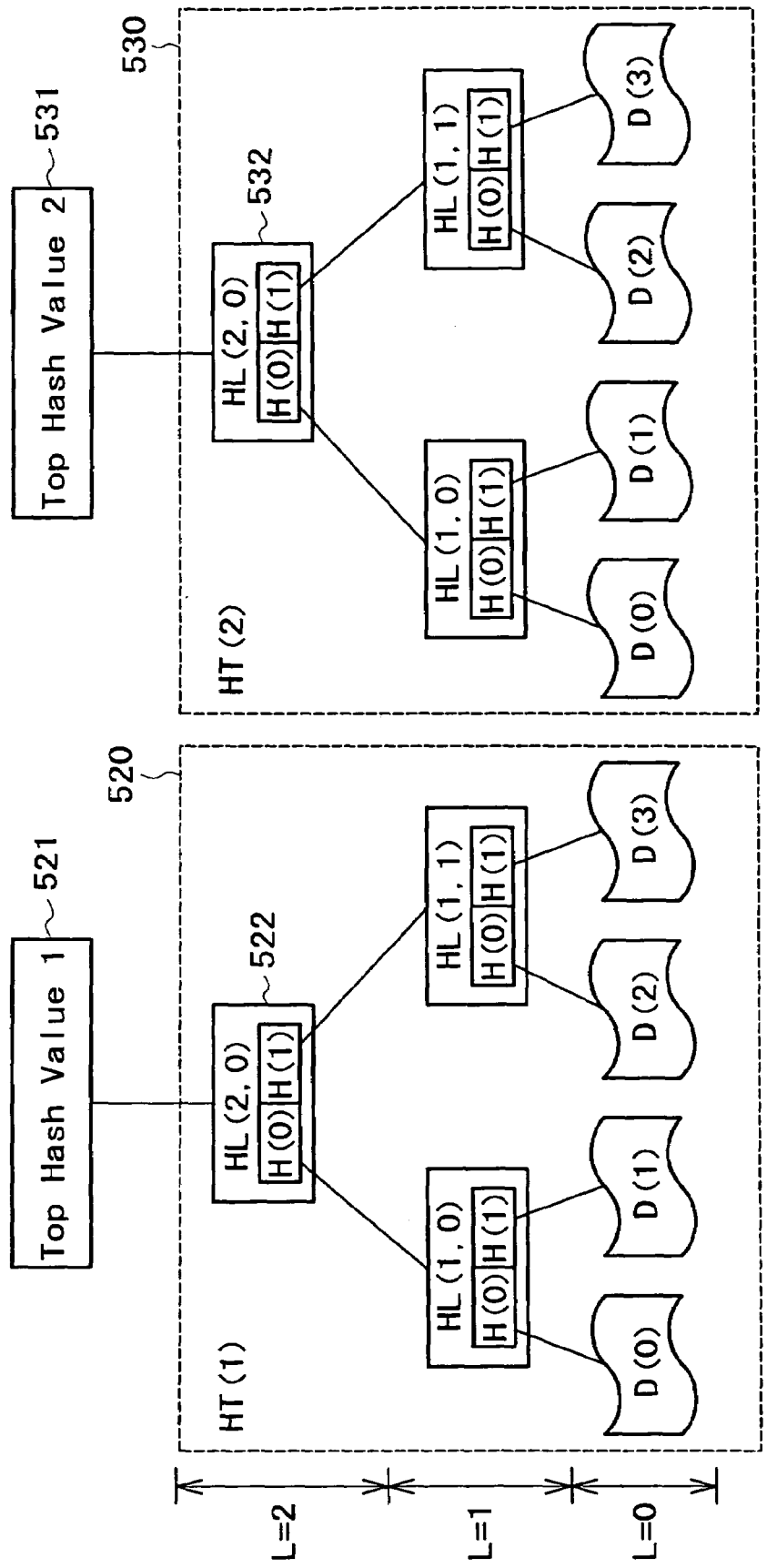
FIG. 15 is an explanatory diagram showing a data management configuration based on a plurality of data-management trees.

As shown in FIG. 15, for example, in a configuration comprising two 2-branch data-management trees each having a hierarchical-layer count m of three and two hash values per hash list, top hash values one and two denoted by reference numerals 521 and 531 respectively are stored in the secure memory 203 employed in the security chip 105 as management-data verification values of a first data-management tree HT(1) 520 and a second data-management tree HT(2) 530 respectively. The top hash value 521 (top hash value 1) is a hash value of a hash list 522 on a hierarchical layer at the top level of the first data-management tree HT(1) 520. On the other hand, the top hash value 531 (top hash value 2) is a hash value of a hash list 532 on a hierarchical layer at the top level of the second data-management tree HT(2) 530.

If a data verification process or a data-updating process is carried out in this configuration, the data management apparatus 101 informs the security chip 105 of which data-management tree comprises management-object data to be processed. Informed by the data management apparatus 101, the security chip 105 selects the data-management tree comprising management-object data to be processed, and carries out the processing. By providing a configuration in which management-data verification values managed by the secure memory 203 employed in the security chip 105 are added and deleted on the basis of a command issued by the CPU 102 employed in the data management apparatus 101, the number of management-data trees being managed can be changed arbitrarily.

[12. Configuration Using the Root Hash List as a Data-Management Verification Value]

In the embodiments described above, the top hash value is stored in the secure memory 203 of the security chip 105 as a data-management verification value. In place of the top hash value, however, the top hash list itself can be stored in the secure memory 203 of the security chip 105 as a data-management verification value.

Figure 16:
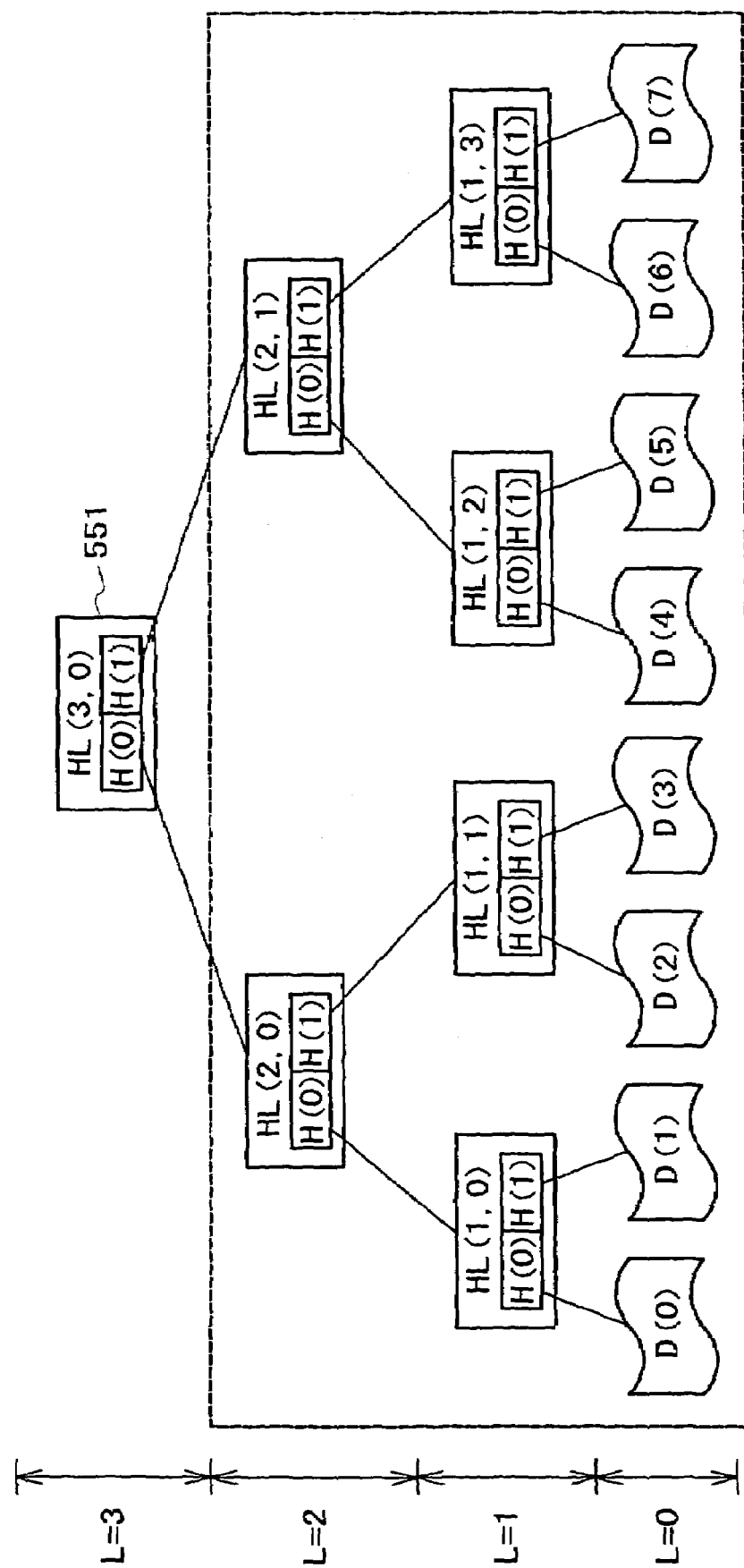
FIG. 16 is an explanatory diagram showing a typical process to set a hash list as a management-data verification value.

In a data-management tree having a hierarchical-layer count m of three as shown in FIG. 16, for example, a top (root) hash list 551 itself is stored in the secure memory 203 of the security chip 105 as a data-management verification value instead of finding a top hash value on the basis of the top hash list 551 and storing the top hash value in the secure memory 203 employed in the security chip 105. It is to be noted that, in the case of an n-branch data-management tree, the top hash list 551 comprises n hash values, which are stored in the secure memory 203 employed in the security chip 105 in consequence. It is also worth noting that the n hash values are each stored in the secure memory 203 employed in the security chip 105, being associated with a hash-value index k assigned thereto.

[13. Configuration Setting and Managing Management-Data Verification Values for any Portions of the Data-Management Tree]

In the embodiments described above, in general, a management-data verification value is associated with a data-management tree. That is to say, the top hash value is set as the management-data verification value. However, any data in the data-management tree or any hash list therein can be set as a management-data verification value.

Figure 17:
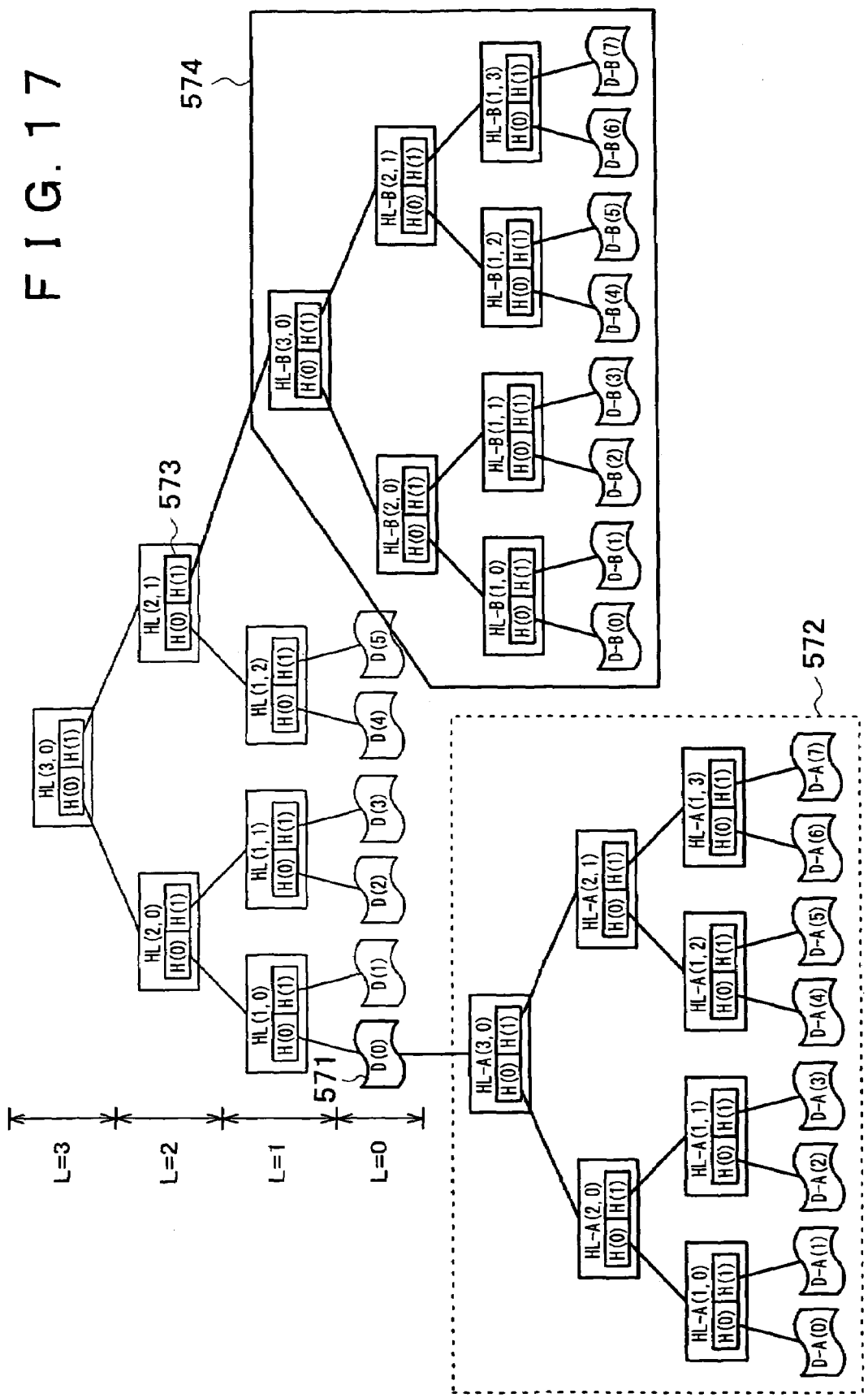
FIG. 17 is an explanatory diagram showing a typical process to set a variety of elements in data-management trees as a management-data verification value.

As shown in FIG. 17, for example, any data in the data-management tree or any hash list therein can be set as a management-data verification value. Data D (0) 571 shown in FIG. 17 is a management-data verification value of a data-management tree 572, which comprises hash lists HL-A and pieces of data D-A.

A hash value HL (2, 1).H (1) 573 in one of hash lists shown in FIG. 17 is a management-data verification value of a data-management tree 574, which comprises hash lists HL-B and pieces of data D-B.

These management-data verification values are stored in the secure memory 203 employed in the security chip 105 and read out from the secure memory 203 to be used in a data verification or updating process in accordance with a data-management tree comprising data to serve as an object of verification or to be updated.

[14. Data-Management Tree Comprising Hash Values]

In the embodiments described above, a data-management tree comprises hash lists, which each comprise a plurality of hash values and are organized to form hierarchical layers. However, the data-management tree can also be designed into a configuration in which every hash list is replaced with a hash value.

Figure 18:
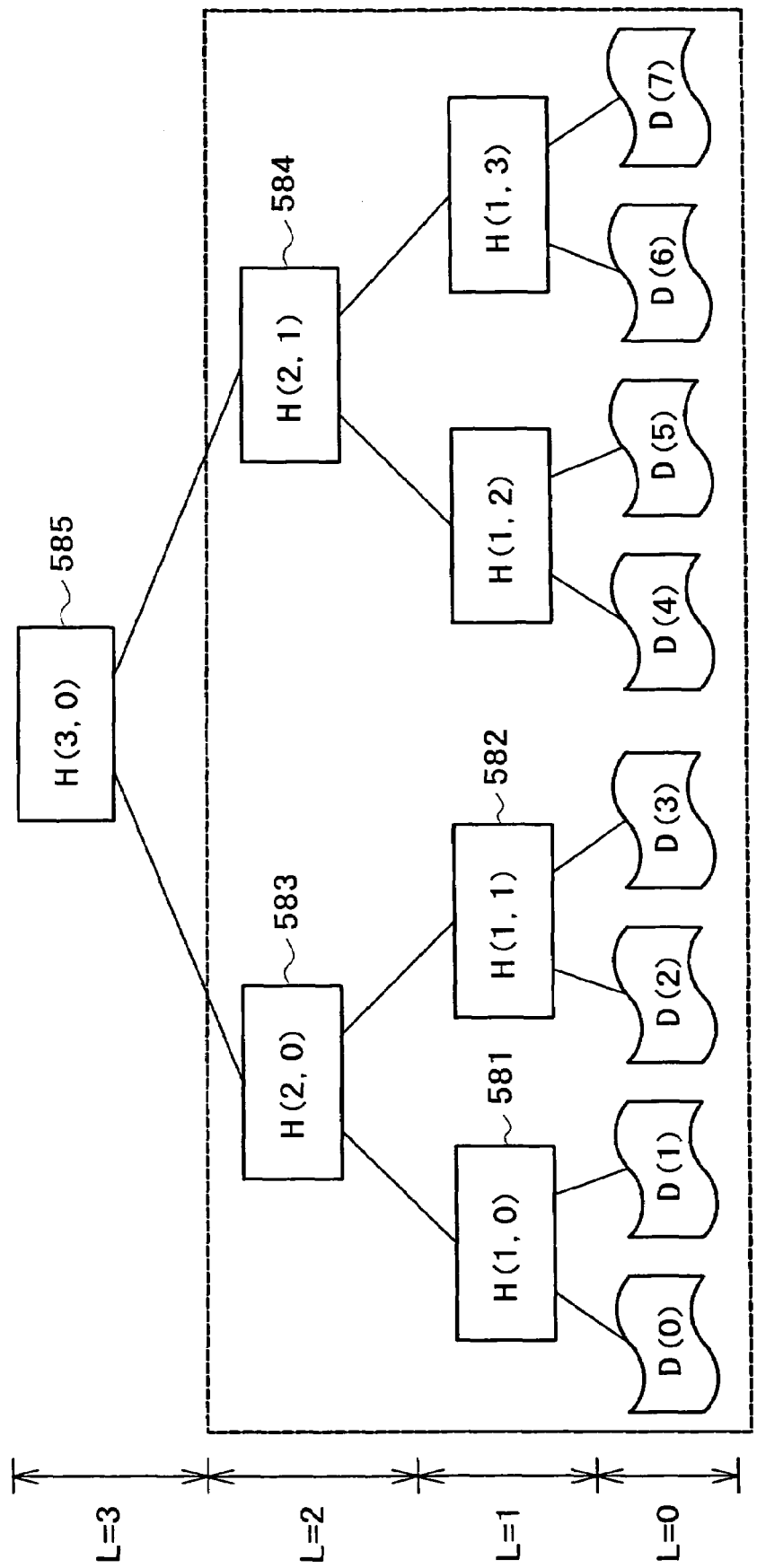
FIG. 18 is an explanatory diagram showing the configuration of a data-management tree comprising hash values organized into hierarchical layers.

As shown in FIG. 18, pieces of management-object data D (0) to D (7) are set on the hierarchical layer L (=0) at the lowest level. On every hierarchical layer L (>0) at a higher level, a single hash value replaces each of a plurality of hash lists, which each used to comprise a plurality of hash values in accordance with the embodiments described so far.

In the data-management tree shown in FIG. 18, the number of hierarchical layers is four and the number of pieces of management-object data is eight. In the figure, notation D (x) denotes a piece of management-object data on a hierarchical layer L (=0) and notation x denotes an index assigned to the management-object data D (x). Notation H (x, y) denotes a hash value on a hierarchical layer L (>0), notation x denotes a number assigned to the hierarchical layer L in the data-management tree and notation y denotes an index assigned to the hash value (x, y) on the hierarchical layer L (=x). The hash value H (x, y) is a hash value generated on the basis of data linking all pieces of data directly subordinate to the hash value H (x, y).

For example, a hash value H (1, 0) denoted by reference numeral 581 is a hash value generated on the basis of pieces of data D (0) and D (1). To put it concretely, the hash value H (1, 0) 581 is generated by typically applying a hash algorithm such as SHA-1 on the basis of data linking the pieces of data D (0) and D (1). That is to say, the hash value H (1, 0) 581 can be expressed by the following expression:

Hash (D(0)||D(1))

where notation || denotes a data-linking operator.

A hash value H (2, 0) 583 is a hash value generated on the basis of the hash value H (1, 0) 581 and a hash value H (1, 1) 582. On the other hand, a hash value H (3, 0) 585 is a hash value generated on the basis of the hash value H (2, 0) 583 and a hash value H (2, 1) 584.

FIG. 18 is a diagram showing the structure of a 2-branch data-management tree in which every hash list comprises two hash values. The hash value H (3, 0) 585 is the top hash value of the data-management tree. The secure memory 203 employed in the security chip 105 is used for storing at least the top hash value H (3, 0) as a management-data verification value. Other data is stored in the host storage unit 104 employed in the data management apparatus 101.

Figure 19:
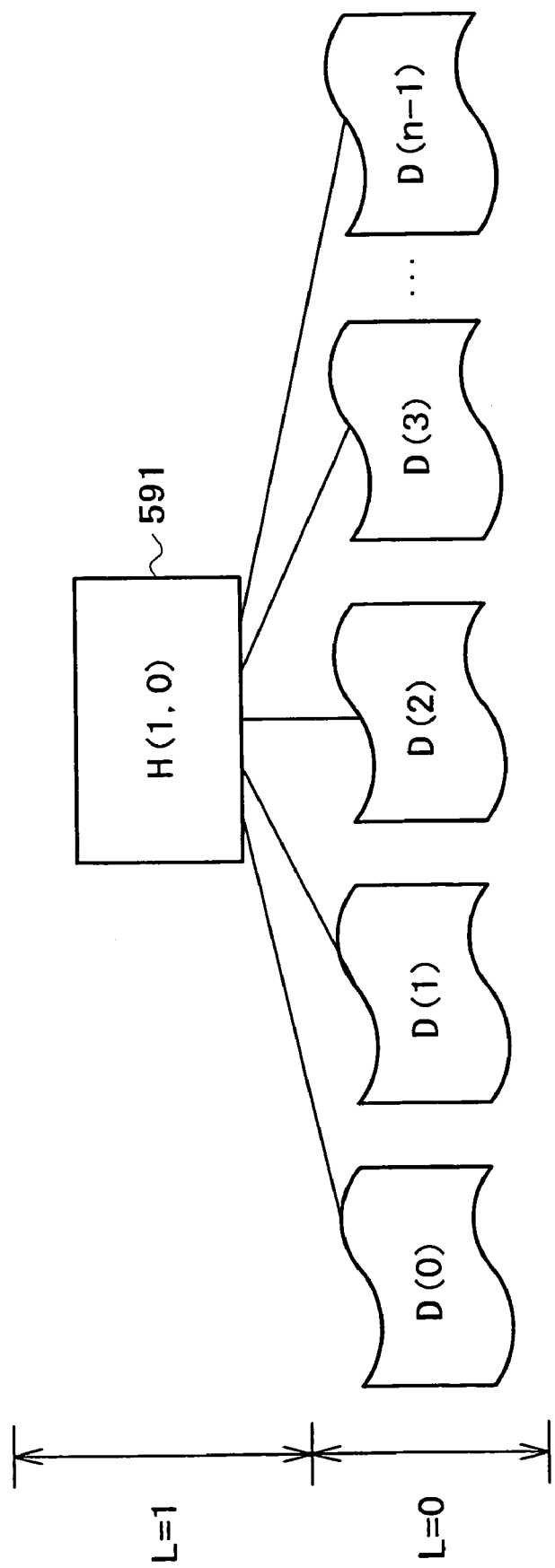
FIG. 19 is an explanatory diagram showing the configuration of a data-management tree comprising hash values organized into one hierarchical layer.

A data-management method based on a data-management tree comprising hash values organized to form hierarchical layers as described above allows processing such as the data verification process, the data addition process, the data modification process, the data deletion process, the hierarchical-layer modification process, the encryption process, the data verification process based on an intermediate node and the process to manage a plurality of data-management tree to be carried out in the same way as the data-management method based on a data-management tree comprising hash lists organized to form hierarchical layers. In comparison with a data-management tree comprising hash lists organized to form hierarchical layers, in the case of a data-management tree comprising hash values organized to form hierarchical layers, a hash value is computed in a data verification process by linking a plurality of pieces of data. Thus, it is quite within the bounds of possibility that the process time becomes longer. In the case of management-object data with a large size, the process time is particularly long. However, the data-management tree comprising hash values organized to form hierarchical layers offers a merit that the amount of information required for management of data as information other than the management-object data itself is small. FIG. 19 is a diagram showing a data-management tree for implementing a method requiring a smallest amount of information for management of data as information other than the management-object data itself.

FIG. 19 is a diagram showing a typical data-management tree comprising hash values organized to form hierarchical layers with a hierarchical-layer count m of two and n pieces of management-object data. In the case of a data-management tree with such a configuration, the top hash value H (1, 0) denoted by reference numeral 591 is a hash value found on the basis of data linking all the n pieces of management-object data. That is to say, the top hash value H (1, 0) is the only required information other than the pieces of management-object data themselves and expressed by the following expression:

Hash(D(0)||D(1)||D(2)||D(3)|| - - - ||D(n−1))

The secure memory 203 employed in the security chip 105 is used for storing only the top has value (1, 0) 591 as a management-data verification value. In this case, no information required for the data management exists as information other than the pieces of management-object data themselves, which are stored in the host storage unit 104 employed in the data management apparatus 101.

Figure 20:
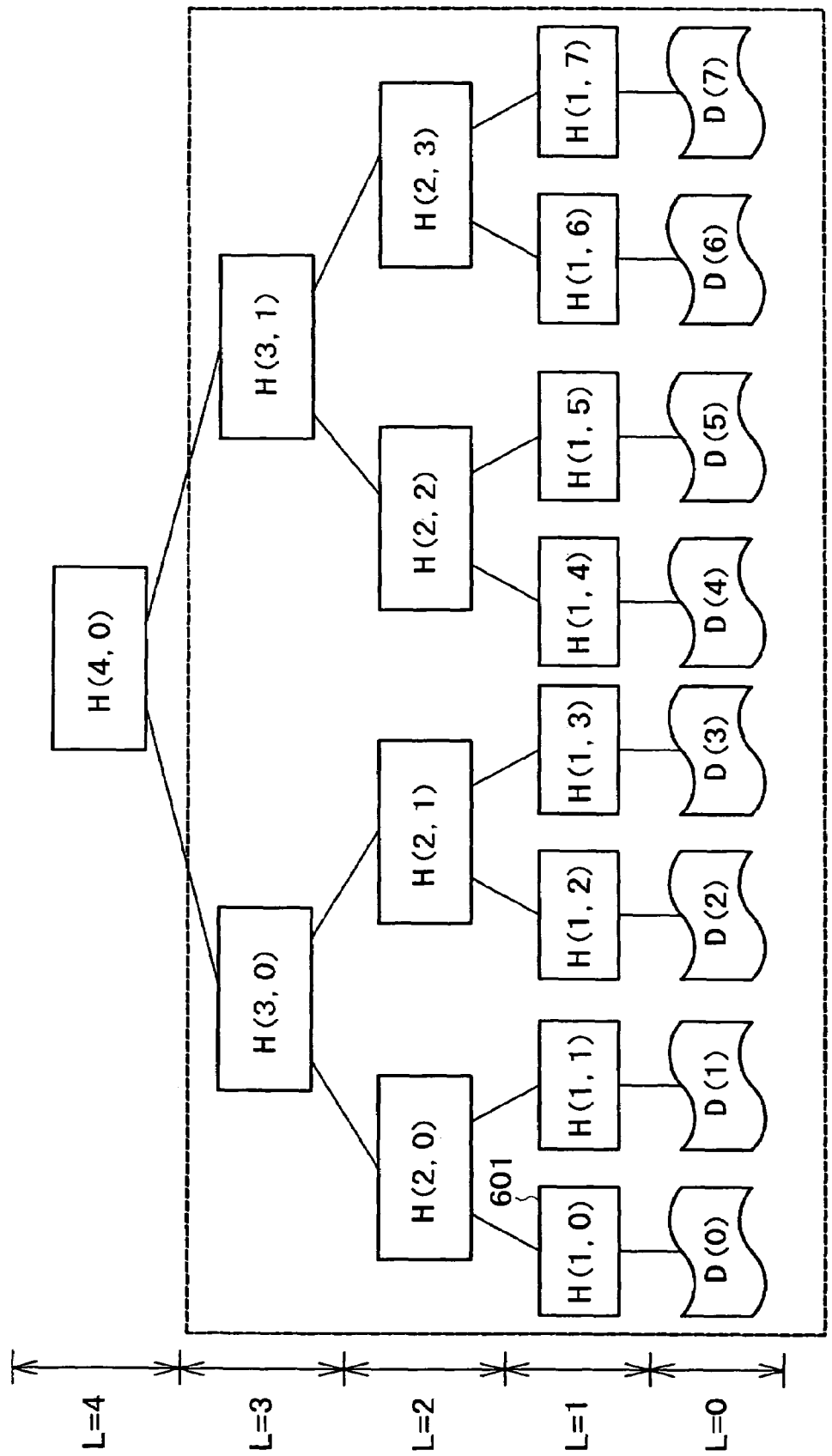
FIG. 20 is an explanatory diagram referred to in explanation of a process to generate a hash value of each piece of management-object data and create a data-management tree including the generated hash values.

FIG. 20 is a diagram showing the data structure of a data-management tree based on organized hash values, which are adjusted to shorten the time it takes to carry out processing such as the data verification process even for management-object data having a large size.

FIG. 20 is a diagram showing a typical data-management tree comprising hash values organized to form hierarchical layers with a hierarchical-layer count m of five and a management-data count of eight. This data-management tree is different from that shown in FIG. 18 in that, in the case of the data-management tree shown in FIG. 20, the number of pieces of management-object data required for computing every hash value on the hierarchical layer L (=1) is reduced by one. In consequence, however, the number of hierarchical layers is incremented by one.

That is to say, every hash value on the hierarchical layer L (=1) is generated from only one piece of management-object data. For example, a hash value H (1, 0) denoted by reference numeral 601 is generated from only the management-object data D (0).

With such a configuration, the time it takes to carry out processing such as the data verification process can be shortened to a value approximately equivalent to that for a data-management tree based on organized hash lists even for management-object data having a large size. In consequence, however, the amount of information required for management of data as information other than the management-object data itself stored in the host storage unit 104 employed in the data management apparatus 101 increases to a value approximately equivalent to that for a data-management tree based on organized hash lists.

So far, the present invention has been explained in detail by describing preferred embodiments. It is obvious, however, that a person skilled in the art is capable of modifying the embodiments or creating substitutes for the embodiments in a range not departing from essentials of the present invention. That is to say, this specification explains the present invention by merely describing preferred embodiments, which are not to be interpreted as limitations to the present invention. The essentials of the present invention can be determined only by referring to ranges defined by claims appended at the end of this specification.

It is to be noted that the series of processes described above can be carried out in a configuration by hardware or software or in a compound configuration using both software and hardware. If the series of processes is to be carried out by executing a variety of programs composing the software, the programs prescribing process sequences are installed typically from a download site or a recording medium into a computer comprising embedded special-purpose hardware. Such programs can also be installed into a general-purpose personal computer capable of carrying out a variety of functions by execution of the installed programs.

Instead of installing the programs into a computer or a personal computer from a download site or a recording medium, the programs can also be distributed to the user by storing the programs in advance typically in a recording medium such as a ROM and/or a hard disk, which are comprised in a computer or a personal computer. If the programs are to be installed into a computer or a personal computer from a recording medium, however, the programs are made available as package software recorded temporarily or permanently in a removable recording medium. The removable recording medium, from which the programs are to be installed into a computer or a personal computer, can be a flexible disk, a CD-ROM (Compact Disk Read-Only Memory), an MO (magneto-optical) disk, a DVD (Digital Versatile Disk), a magnetic disk or a programmable recording medium such as a semiconductor memory.

It is to be noted that, instead of installing the programs into a computer or a personal computer from a removable recording medium as described above, the programs can be installed into a computer or a personal computer from a download site mentioned earlier. In this case, the programs are downloaded to the computer or the personal computer by radio communication or by way of a network such as a LAN (Local Area Network) or the Internet. Then, the computer or the personal computer is capable of installing the received programs into an embedded recording medium such as a hard disk.

It is to be noted that, in this specification, steps prescribing a program stored in a recording medium can of course be executed sequentially along the time axis in a predetermined order. It is also worth noting that, however, the steps do not have to be executed sequentially along the time axis in a predetermined order. Instead, the steps may comprise pieces of processing to be carried out concurrently or individually in dependence on the processing power of an apparatus for carrying out the processing or in dependence on necessity. In addition, a system in this specification means the entire system comprising a plurality of apparatus logically connected to each other. However, the apparatus do not have to be physically enclosed in a cabinet.

A data management apparatus provided by the present invention, a data management method adopted in the data management apparatus and a computer program for implementing the data management method can be applied to a configuration for managing data comprising a content, a license and charging data in order to avoid falsification of the data.

In the configuration of the present invention, data set at the top of a data-management tree is stored in typically a memory employed in a security chip. The stored data such as a hash value is a result of computation applying an irreversible function based on data directly subordinate to the computed data. The stored hash value is used as a management-data verification value for verifying validity of management-object data provided on a hierarchical layer at the bottom level of the data-management tree. Thus, even if the number of pieces of management-object data increases, it is not necessary to increase the data amount of the management-data verification value. That is to say, an anti-falsification verification process can be carried out on a large number of pieces of management-object data without increasing the data amount of the management-data verification value. As a result, the present invention can be applied to applications for executing various kinds of data management. In addition, the present invention also provides a configuration in which a data verification process based on hash values comprised in the data-management tree is also carried out in data-updating processing such as operations to add, delete and change management-object data. Thus, the present invention can also be utilized in an apparatus carrying out data-updating processing such as operations to add, delete and change management-object data.

What is claimed is:

1. A data management apparatus comprising:
   a management-data storage unit configured to store management-object data;
   a management-data verification-value storage unit configured to store a top value placed on the top of an n-branch data-management tree as a management-data verification value where n is an integer equal to or greater than two, said management-data storage unit being a different storage device than said management-data verification-value storage unit; and
   a data verification process unit configured to carry out a process to verify validity of said management-object data on the basis of said management-data verification value, said data verification processing unit including,
      a verification route determination unit configured to determine a verification route between said top of said n-branch data-management tree and said management-object data in the lowest level, and
      a verification unit configured to execute data verification based on the data of n-branch management tree sequentially along said verification route determined by verification route determination unit, wherein said n-branch data-management tree comprises
   a hierarchical structure having
      a lowest level containing said management-object data, and
      higher levels containing data that results from computation by using a irreversible function based on other data located on another hierarchical layer at a level directly subordinate to said specific hierarchical layer, each data containing at least two computation results from management-data verification values of a different branch directly subordinate to said specific hierarchical layer; and
   said top value is a result of computation by using said irreversible function based on data located on a hierarchical layer at the highest level of said n-branch data-management tree, said verification route being represented by a sequence of index values from nodes at respective hierarchical layers so that when said verification unit executes data verification, the verification unit evaluates data only along said verification route in said n-branch management tree, and not along other routes that are not described by said verification route.

2. A data management apparatus according to claim 1 wherein said irreversible function is a hash function.

3. A data management apparatus according to claim 1 wherein said management-data verification-value storage unit is a secure memory embedded in a security chip having a tamper prevention configuration.

4. A data management apparatus according to claim 1 wherein said data verification process unit is embedded in a security chip having a tamper prevention configuration; and
   is configured to carry out a data verification process by inputting data required in said data verification process from said management-data storage unit.

5. A data management apparatus according to claim 1 wherein
   said management-data verification-value storage unit is a secure memory embedded in a security chip having a tamper prevention configuration; and
   said data verification process unit is configured to carry out a data verification process by inputting management-data verification-value required in said data verification process from said secure memory.

6. A data management apparatus according to claim 1 wherein:
   nodes composing said n-branch data-management tree are each a data list comprising n values each obtained as a result of computation by using said irreversible function based on n pieces of data located on a hierarchical layer at a level directly subordinate to said data list; and
   said data verification process unit carries out data verification processes each determining whether or not verification data matches collation data sequentially, one process after another, in a direction from a hierarchical layer at a high level to a hierarchical layer at a low level or from a hierarchical layer at a low level to a hierarchical layer at a high level through said n-branch data-management tree where:
   said verification data is a result of computation by using said irreversible function based on data provided on a lower-level hierarchical layer;
   said collation data is data already comprised on a data list on a higher-level hierarchical layer as a computation result of said irreversible function; and
   said lower-level hierarchical layer and said higher-level hierarchical layer are any arbitrary two hierarchical layers in said n-branch data-management tree with said lower-level hierarchical layer serving as a direct subordinate to said higher-level hierarchical layer.

7. A data management apparatus according to claim 6 wherein said data verification process unit:
   determines a verification route in a direction from a hierarchical layer at a high level to a hierarchical layer at a low level or from a hierarchical layer at a low level to a hierarchical layer at a high level through said n-branch data-management tree on the basis of a list index j serving as an identification of a data list on every hierarchical layer and on the basis of an irreversible-function index k serving as an identification of an irreversible-function computation result on every data list; and
   carries out said data verification processes on data on said determined verification route.

8. A data management apparatus according to claim 7 wherein said data verification process unit determines that no data has been falsified only if said verification data matches said collation data in all said data verification processes carried out sequentially in a direction from a hierarchical layer at a high level to a hierarchical layer at a low level or from a hierarchical layer at a low level to a hierarchical layer at a high level through said n-branch data-management tree.

9. A data management apparatus according to claim 1 wherein said data verification process unit carries out said data verification processes in a direction from a hierarchical layer at a high level to a hierarchical layer at a low level or from a hierarchical layer at a low level to a hierarchical layer at a high level through said n-branch data-management tree as part of a data-updating process accompanying an operation to add, delete or change data in said n-branch data-management tree, and updates data only if said verification data matches said collation data in all said data verification processes.

10. A data management apparatus according to claim 1 wherein, as part of processing for modifying a configuration of hierarchical layers to accompany an operation to add a hierarchical layer to said n-branch data-management tree or delete a hierarchical layer from said n-branch data-management tree, said data verification process unit carries out a data verification process based on pre-updating data as a process to verify validity of data required for a data-updating process accompanying said processing for modifying a configuration of hierarchical layers, and permits said processing for modifying a configuration of hierarchical layers only if a result of said data verification process determines that no data has been falsified.

11. A data management apparatus according to claim 1 wherein:
   said management-data verification-value storage unit is used for storing said top value, which is placed on the top of said n-branch data-management tree as a result of computation by using said irreversible function, as a management-data verification value and storing intermediate data on a hierarchical layer at an intermediate level of said n-branch data-management tree as another management-data verification value; and
   said data verification process unit carries out a data verification process by using said intermediate data as a management-data verification value in order to verify validity of data comprised in said n-branch data-management tree as data subordinate to said intermediate data.

12. A data management apparatus according to claim 1 wherein:
   said management-data verification-value storage unit is used for storing a plurality of computation results, which are output by said irreversible function for as many data-management trees as said computation results and placed on the tops of said respective data-management trees, each as a management-data verification value; and
   in order to verify validity of data comprised in a specific one of said data-management trees, said verification process unit carries out a data verification process setting one of said computation results, which is output by said irreversible function and placed on the top of said specific data-management tree, as a management-data verification value.

13. A data management apparatus according to claim 1 wherein:
   said management-data storage unit is used for storing encrypted management-object data; and
   a key applicable to encryption or decryption of said management-object data is stored in a storage unit employed in a security chip having a tamper prevention configuration.

14. A data management apparatus according to claim 1 wherein:
   said management-data storage unit is used for storing encrypted management-object data;
   a second key for encrypting a first key applicable to encryption or decryption of said management-object data is stored in a storage unit employed in a security chip having a tamper prevention configuration; and
   said encrypted first key is decrypted in said security chip by using said second key and said first key obtained as a result of decryption is output to a component outside said security chip.

15. A data management apparatus according to claim 1 wherein:
   each of nodes composing said n-branch data-management tree comprises an only-one value generated as a result of computation by using said irreversible function based on said n pieces of data located on a hierarchical layer at a level directly subordinate to said node; and
   said data verification process unit carries out a process determining whether or not verification data matches collation data where:
   said verification data is a result of computation by using said irreversible function based on n pieces of data provided on a lower-level hierarchical layer;
   said collation data is an only-one value already placed on a higher-level hierarchical layer as a computation result of said irreversible function; and
   said lower-level hierarchical layer and said higher-level hierarchical layer are any arbitrary two hierarchical layers in said n-branch data-management tree with said lower-level hierarchical layer serving as a direct subordinate to said higher-level hierarchical layer.

16. A computer-implemented data management method for data verification, the method comprising:
   storing management-object data in a memory device;
   storing a top value in a different memory device;
   using the top value placed on the top of an n-branch data-management tree, where n is an integer equal to or greater than two, as a management-data verification value, said n-branch data-management tree including
   a hierarchical structure having
      a lowest level containing management-object data, and
      higher levels containing data that results from computation by using an irreversible function based on other data located on another hierarchical layer at a level directly subordinate to said specific hierarchical layer, each data at the another hierarchical layer containing at least two computation results from management-data verification values of a different branch directly subordinate to said specific hierarchical layer;

arranging said lower-level hierarchical layer and said higher-level hierarchical layer such that any arbitrary two hierarchical layers in said n-branch data-management tree with said lower-level hierarchical layer serving as a direct subordinate to said higher-level hierarchical layer;

determining with a verification route determination unit a verification route between said top of said n-branch data-management tree and said management-object data in the lowest level, said verification route being represented by a sequence of index values from nodes at respective hierarchical layers so that when said verification unit executes data verification the verification unit evaluates data only along said verification route in said n-branch management tree, and not along other routes that are not described by said verification route;

computing with a processor said top value using said irreversible function based on data located on a hierarchical layer at the highest level of said n-branch data-management tree;

determining whether or not verification data matches collation data sequentially, one process after another, in a direction from a hierarchical layer at a high level to a hierarchical layer at a low level or from a hierarchical layer at a low level to a hierarchical layer at a high level through said n-branch data-management tree, computing said verification data using said irreversible function based on data provided on a lower-level hierarchical layer, said collation data is data already comprised in data on a higher-level hierarchical layer as a computation result of said irreversible function; and executing data verification based on the data of n-branch management tree sequentially along said verification route determined by verification route determination unit.

17. A data management method according to claim 16 wherein said irreversible function is a hash function.

18. A data management method according to claim 16 wherein:

nodes composing said n-branch data-management tree are each a data list comprising n values each obtained as a result of computation by using said irreversible function based on n pieces of data located on a hierarchical layer at a level directly subordinate to said data list; and at said data verification step, determination processes are carried out as processes each determining whether or not verification data matches collation data sequentially, one process after another, in a direction from a hierarchical layer at a high level to a hierarchical layer at a low level or from a hierarchical layer at a low level to a hierarchical layer at a high level through said n-branch data-management tree where:

said verification data is a result of computation by using said irreversible function based on data provided on a lower-level hierarchical layer;

said collation data is data already comprised on a data list on a higher-level hierarchical layer as a computation result of said irreversible function; and said lower-level hierarchical layer and said higher-level hierarchical layer are any arbitrary two hierarchical layers in said n-branch data-management tree with said lower-level hierarchical layer serving as a direct subordinate to said higher-level hierarchical layer.

19. A data management method according to claim 16, said data management method further comprising the step of determining a verification route in a direction from a hierarchical layer at a high level to a hierarchical layer at a low level or from a hierarchical layer at a low level to a hierarchical layer at a high level through said n-branch data-management tree on the basis of a list index j serving as an identification of a data list on every hierarchical layer and on the basis of an irreversible-function index k serving as an identification of an irreversible-function computation result on every data list whereby, at said data verification step, said data verification processes are carried out on data on said determined verification route.

20. A data management method according to claim 16 wherein, said data verification processes are carried out in a direction from a hierarchical layer at a high level to a hierarchical layer at a low level or from a hierarchical layer at a low level to a hierarchical layer at a high level through said n-branch data-management tree as part of a data-updating process accompanying an operation to add, delete or change data in said n-branch data-management tree, and data is updated only if said verification data matches said collation data in all said data verification processes.

21. A data management method according to claim 16 wherein, as part of processing for modifying a configuration of hierarchical layers to accompany an operation to add a hierarchical layer to said n-branch data-management tree or delete a hierarchical layer from said n-branch data-management tree, a data verification process based on pre-updating data is carried out as a process to verify validity of data required for a data-updating process accompanying said processing for modifying a configuration of hierarchical layers, and said processing for modifying a configuration of hierarchical layers is permitted only if a result of said data verification process determines that no data has been falsified.

22. A data management method according to claim 16 wherein, at said data verification step, a data verification process using intermediate data on a hierarchical layer at an intermediate level of said n-branch data-management tree as a management-data verification value is carried out in order to verify validity of data comprised in said n-branch data-management tree as data subordinate to said intermediate data.

23. A data management method according to claim 16 wherein, at said data verification step, a process is carried out to determine whether or not verification data matches collation data where:

said verification data is a result of computation by using said irreversible function based on n pieces of data provided on a lower-level hierarchical layer;

said collation data is an only-one value already placed on a higher-level hierarchical layer as a computation result of said irreversible function; and said lower-level hierarchical layer and said higher-level hierarchical layer are any arbitrary two hierarchical layers in said n-branch data-management tree with said lower-level hierarchical layer serving as a direct subordinate to said higher-level hierarchical layer.

24. A computer readable storage medium encoded with a computer program configured to cause an information processing apparatus to execute a method for carrying out a data verification process, the method comprising:

storing management-object data in a memory device;

storing a top value in a different memory device;

using the top value placed on the top of an n-branch data-management tree, where n is an integer equal to or greater than two, as a management-data verification value, said n-branch data-management tree including a hierarchical structure having a lowest level containing management-object data, and higher levels containing data that results from computation by using an irreversible function based on other data located on another hierarchical layer at a level directly subordinate to said specific hierarchical layer, each data at the anther hierarchical layer containing at least two computation results from management-data verification values of a different branch directly subordinate to said specific hierarchical layer;

arranging said lower-level hierarchical layer and said higher-level hierarchical layer such that any arbitrary two hierarchical layers in said n-branch data-management tree with said lower-level hierarchical layer serving as a direct subordinate to said higher-level hierarchical layer;

determining with a verification route determination unit a verification route between said top of said n-branch data-management tree and said management-object data in the lowest level, said verification route being represented by a sequence of index values from nodes at respective hierarchical layers so that when said verification unit executes data verification the verification unit evaluates data only along said verification route in said n-branch management tree, and not along other routes that are not described by said verification route;

computing with a processor said top value using said irreversible function based on data located on a hierarchical layer at the highest level of said n-branch data-management tree;

determining whether or not verification data matches collation data sequentially, one process after another, in a direction from a hierarchical layer at a high level to a hierarchical layer at a low level or from a hierarchical layer at a low level to a hierarchical layer at a high level through said n-branch data-management tree, computing said verification data using said irreversible function based on data provided on a lower-level hierarchical layer, said collation data is data already comprised in data on a higher-level hierarchical layer as a computation result of said irreversible function; and executing data verification based on the data of n-branch management tree sequentially along said verification route determined by verification route determination unit.

25. The data management apparatus according to claim 1, wherein said verification route is in the direction from said top of said n-branch data-management tree to said management-object in the lowest level, or in the direction from said management-object data in the lowest level to said top of said n-branch data-management tree.

* * * * *